(12) United States Patent
Suzuki

(10) Patent No.: US 9,525,806 B2
(45) Date of Patent: Dec. 20, 2016

(54) IMAGING APPARATUS WITH A ROTATABLE DISPLAY

(71) Applicant: SONY CORPORATION, Tokyo (JP)

(72) Inventor: Takumi Suzuki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/634,623

(22) Filed: Feb. 27, 2015

(65) Prior Publication Data

US 2015/0256724 A1 Sep. 10, 2015

(30) Foreign Application Priority Data

Mar. 7, 2014 (JP) ................. 2014-045476

(51) Int. Cl.
*H04N 5/225* (2006.01)
*H04N 5/232* (2006.01)
*G03B 11/04* (2006.01)

(52) U.S. Cl.
CPC ........... *H04N 5/2252* (2013.01); *G03B 11/043* (2013.01); *H04N 5/2254* (2013.01); *H04N 5/23293* (2013.01)

(58) Field of Classification Search
CPC . H04N 5/2252; H04N 5/2254; H04N 5/23293
See application file for complete search history.

(56) References Cited

U.S. PATENT DOCUMENTS

| 5,739,859 | A | * | 4/1998 | Hattori | H04N 5/23293 348/333.06 |
| 6,453,122 | B1 | * | 9/2002 | Misawa | H04N 5/225 348/376 |
| 7,508,439 | B2 | * | 3/2009 | Naito | H04N 5/23293 348/14.07 |
| 2004/0183942 | A1 | * | 9/2004 | Holmberg | H04N 5/2253 348/373 |
| 2007/0279511 | A1 | * | 12/2007 | Misawa | H04N 5/2251 348/333.06 |
| 2013/0321691 | A1 | | 12/2013 | Naito et al. | |

FOREIGN PATENT DOCUMENTS

JP 2005-189601 A 7/2005

* cited by examiner

*Primary Examiner* — Gevell Selby
(74) *Attorney, Agent, or Firm* — Chip Law Group

(57) ABSTRACT

There is provided an imaging apparatus including an apparatus body provided with an imaging lens on one end, a cap body capable of moving between an open position and a closed position with respect to the apparatus body, the cap body being provided with a display, and a support mechanism that movably supports the cap body with respect to the apparatus body. The imaging lens is closed while the cap body is positioned in the closed position, and the imaging lens is opened while the cap body is positioned in the open position.

19 Claims, 33 Drawing Sheets

IMAGING APPARATUS WITH A ROTATABLE DISPLAY

CROSS REFERENCE TO RELATED APPLICATIONS

This application claims the benefit of Japanese Priority Patent Application JP 2014-045476 filed Mar. 7, 2014, the entire contents of which are incorporated herein by reference.

BACKGROUND

The present technology relates to a technical field of an imaging apparatus in which an imaging lens is provided in an apparatus body and the imaging lens is opened/closed by a cap body.

Some types of various imaging apparatuses such as video cameras and still cameras include an apparatus body provided with an imaging lens and a housing provided with a display and the housing is made rotatable with respect to the apparatus body (see, for example, JP 2005-189601A and JP 2013-254007 (US Patent Application Publication US20130321691)).

In such an imaging apparatus, the display can be protected by rotating the housing to a closed position when not used for shooting and the usability during shooting can be improved by visually recognizing the display by rotating the housing to an open position for shooting.

In addition, images captured in the closed position can be played back by rotating the housing to the closed position while the display is made to point to the outer side.

Further, the direction in which the imaging lens points and the direction in which the display points can be made different by rotating the housing to a predetermined position during shooting and thus, a subject can be shot in various shooting states, for example, high-angle shooting, low-angle shooting, self shooting and so on.

SUMMARY

In imaging apparatuses described in JP 2005-189601A and JP 2013-254007, however, it is necessary to attach a dedicated cap or the like to a portion of the apparatus body to protect the imaging lens that is not necessary when the imaging apparatus is not used for shooting and the number of components increases correspondingly and the reduction in size is made more difficult.

Therefore, it is desirable for an imaging apparatus according to the present technology to reduce the size thereof by decreasing the number of components.

According to a first embodiment of the present disclosure, there is provided an imaging apparatus including an apparatus body provided with an imaging lens on one end, a cap body capable of moving between an open position and a closed position with respect to the apparatus body, the cap body being provided with a display, and a support mechanism that movably supports the cap body with respect to the apparatus body. The imaging lens is closed while the cap body is positioned in the closed position, and the imaging lens is opened while the cap body is positioned in the open position.

Accordingly, the imaging lens is protected by being covered with the cap body provided with the display in the closed position.

In the imaging apparatus according to a second embodiment, the display may closed while the cap body is positioned in the closed position, and the display may opened while the cap body is positioned in the open position.

Accordingly, the display is closed together with the imaging lens while the cap body is positioned in the closed position.

In the imaging apparatus according to a third embodiment, the support mechanism may include a rotation mechanism. The cap body may be rotatably supported on the apparatus body via the rotation mechanism.

Accordingly, the cap body is moved by being rotated with respect to the apparatus body.

In the imaging apparatus according to a fourth embodiment, the support mechanism may include a first fulcrum shaft extending in an optical axis direction of the imaging lens and a second fulcrum shaft extending in a direction orthogonal to the optical axis direction. The cap body may be rotated around the first fulcrum shaft using the first fulcrum shaft as a fulcrum and also rotated around the second fulcrum shaft using the second fulcrum shaft as a fulcrum.

Accordingly, the cap body is rotated in two different directions with respect to the apparatus body.

In the imaging apparatus according to a fifth embodiment, the support mechanism may include a sliding mechanism. The cap body may be slidably supported on the apparatus body via the sliding mechanism.

Accordingly, the cap body is moved by being slid with respect to the apparatus body.

In the imaging apparatus according to a sixth embodiment, the support mechanism may further include a rotation mechanism. The cap body may be rotatably supported on the apparatus body via the rotation mechanism.

Accordingly, the cap body is moved in different directions by both of sliding and rotation with respect to the apparatus body.

In the imaging apparatus according to a seventh embodiment, the cap body may be, in the closed position, in one of an opposed state in which the display points to a side of the apparatus body to be opposed to the imaging lens and a non-opposed state in which the display points to an opposite side of the side of the apparatus body. The imaging apparatus may further include a control unit that sets a playback mode when the cap body is in the non-opposed state.

Accordingly, the playback mode is set without any special operation by the cap body being moved to the closed position.

In the imaging apparatus according to an eighth embodiment, a main power supply may be turned on in accordance with movement of the cap body from the closed position to the open position. Accordingly, there is no need to perform an operation to turn on the main power supply.

In the imaging apparatus according to a ninth embodiment, a surface of the apparatus body on which the imaging lens is provided may be formed as a lens arrangement surface. A surface of the cap body on which the display is provided may be formed as a display arrangement surface. When the cap body is positioned in the closed position, an outer circumference of the lens arrangement surface and an outer circumference of the display arrangement surface may be matched in an optical axis direction of the imaging lens.

Accordingly, the cap body does not protrude to the outer side from the apparatus body in the closed position.

In the imaging apparatus according to a tenth embodiment, the cap body may be formed in a plane shape in which a thickness direction of the cap body matches a thickness direction of the display. Accordingly, the imaging lens is opened/closed by the cap body in a plane shape.

In the imaging apparatus according to an eleventh embodiment, a surface of the cap body on which the display is provided may be formed as a display arrangement surface. An operation button may be arranged on the display arrangement surface.

Accordingly, an operation on the operation button is enabled while the display on which an image is displayed being visually recognized.

In the imaging apparatus according to a twelfth embodiment, a battery insertion hole into which a battery is inserted may be formed in the apparatus body. A cover body movably supported between an opening position and a closing position that opens and closes the battery insertion hole may be provided in the apparatus body. Accordingly, the battery insertion hole can be opened/closed when necessary.

In the imaging apparatus according to a thirteenth embodiment, the cover body may be rotatable with respect to the apparatus body. Accordingly, the cover body is moved with respect to the apparatus body by being rotated.

In the imaging apparatus according to a fourteenth embodiment, a rotatable direction of the cover body with respect to the apparatus body and a rotatable direction of the cap body with respect to the apparatus body may be a same direction. Accordingly, the operation direction to rotate the cap body and the operation direction to rotate the cover body are matched.

In the imaging apparatus according to a fifteenth embodiment, a surface of the apparatus body on which the battery insertion hole may be formed is set as a battery insertion surface. A surface of the cover body that closes the battery insertion hole may be set as an opposed surface. When the cover body is positioned in the closing position, an outer circumference of the battery insertion surface and an outer circumference of the opposed surface may be matched in an optical axis direction of the imaging lens. Accordingly, the cover body does not protrude to the outer side from the apparatus body in the closing position.

In the imaging apparatus according to a sixteenth embodiment, the cover body may be formed in a plane shape in which a thickness direction of the cover body matches an optical axis direction of the imaging lens. Accordingly, the battery insertion hole is opened/closed by the cover body in a plane shape.

In the imaging apparatus according to a seventeenth embodiment, an operation recess capable of having a finger inserted therein may be formed in the cover body. Accordingly, the user can rotate the cover body between the closing position and the opening position by inserting a finger into the operation recess.

In the imaging apparatus according to an eighteenth embodiment, a projection lens may be provided in the apparatus body. The projection lens may be capable of having an image projected therefrom. Accordingly, the imaging apparatus can be used as a projector.

The imaging apparatus according to a nineteenth embodiment, may further include a control unit that sets a projection mode in which the image is projected from the projection lens when the cap body and the apparatus body are positioned vertically while the cap body is in the closed state. Accordingly, the projection mode is set without any special operation by the cap body and the apparatus body being oriented to be positioned vertically.

In the imaging apparatus according to a twentieth embodiment, a coating surface portion in a curved surface shape and a gripping surface portion in a substantially plane shape may be formed on an outer circumferential surface of the apparatus body. Accordingly, the coating surface portion can be wrapped in fingers by pressing the palm against the gripping surface portion during shooting.

According to the present technology, the imaging lens is protected by being covered with the cap body provided with the display in the closed position and therefore, a dedicated member to protect the imaging lens is not necessary and the apparatus can be made smaller in size by decreasing the number of components. Incidentally, the effect described here should not necessarily be restricted and the effect may be any effect described in the present disclosure.

DETAILED DESCRIPTION OF THE EMBODIMENT

Figure 1:
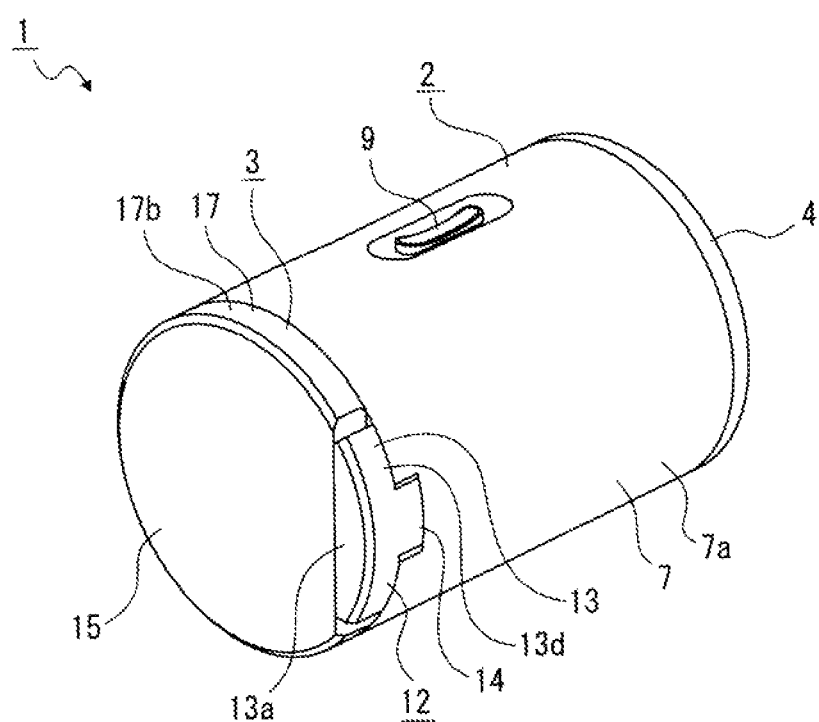
FIG. 1 shows an embodiment of an imaging apparatus according to the present technology together with FIGS. 2 to 33 and this is a perspective view showing a state in which a cap body is in a closed position.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiment shown below is application of an imaging apparatus according to the present technology to a video camera. However, the scope of application of the present technology is not limited to video cameras and may be applied to, for example, still cameras.

In the description that follows, the forward and backward direction, the up and down direction, and the left and right direction are assumed to show the directions viewed from the cameraman when a video camera is shot. Therefore, the side of a subject is the forward direction. Incidentally, the description below of the forward and backward directions, the up and down directions, and the left and right directions is for convenience sake and carrying out the present technology is not limited to these directions.

<Configuration of the Imaging Apparatus>

First, the configuration of the imaging apparatus will be described (see FIGS. 1 to 16).

An imaging apparatus 1 includes, as shown in FIGS. 1 to 9, an apparatus body 2 formed in a shape extending forward and backward, a cap body 3 rotatably supported on a front end of the apparatus body 2, and a cover body 4 rotatably supported on a back end of the apparatus body 2.

The apparatus body 2 includes a front surface whose outside surface is formed as a lens arrangement surface 5, a rear surface formed as a battery insertion surface 6, and an outer circumferential surface 7 positioned therebetween. The lens arrangement surface 5 is formed in a circular shape and the battery insertion surface 6 has an outer circumference formed in a shape including a circular surface and a gently curved surface in an outwardly convex shape.

The outer circumferential surface 7 includes a coating surface portion 7a formed in an outwardly convex curved surface shape and a gripping surface portion 7b in a substantially plane shape pointing laterally. The gripping surface portion 7b occupies about ⅓ of the outer circumferential surface 7. The gripping surface portion 7b is formed in a portion other than the front end of the apparatus body 2 and a prominent portion 8 protruding laterally to continue to the front side of the gripping surface portion 7b is provided on the front end of the apparatus body 2.

A zoom knob 9 is arranged on the top surface of the apparatus body 2. Images to be shot can be zoomed by operating the zoom knob 9.

An imaging lens 10 is provided on the side of the lens arrangement surface 5 (front end) of the apparatus body 2 and an optical axis direction of the imaging lens 10 is set in the forward and backward direction. A plurality of lenses is arranged inside the apparatus body 2 along the forward and backward direction and an imaging device described later such as CCD (Charge Coupled Device) and CMOS (Complementary Metal Oxide Semiconductor) is arranged in the backward direction of these lenses. The optical axis direction in this specification is the optical axis direction of the lens on the incident side and more specifically, the optical axis direction of the imaging lens 10.

Figure 10:
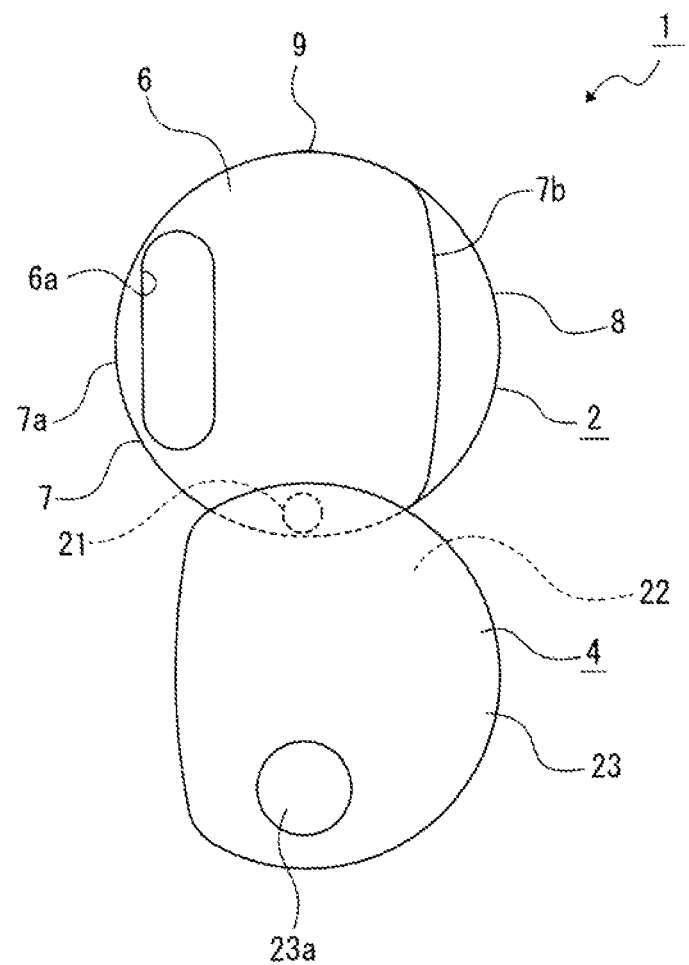
FIG. 10 is a rear view showing the state in which a cover body is rotated to an opening position.

A battery insertion hole 6a through which a battery 11 is inserted is formed on one end of the battery insertion surface 6 (see FIG. 10). The battery 11 is inserted through the battery insertion hole 6a and the inserted battery 11 is arranged in a lateral direction of the plurality of lenses inside the apparatus body 2.

Figure 11:
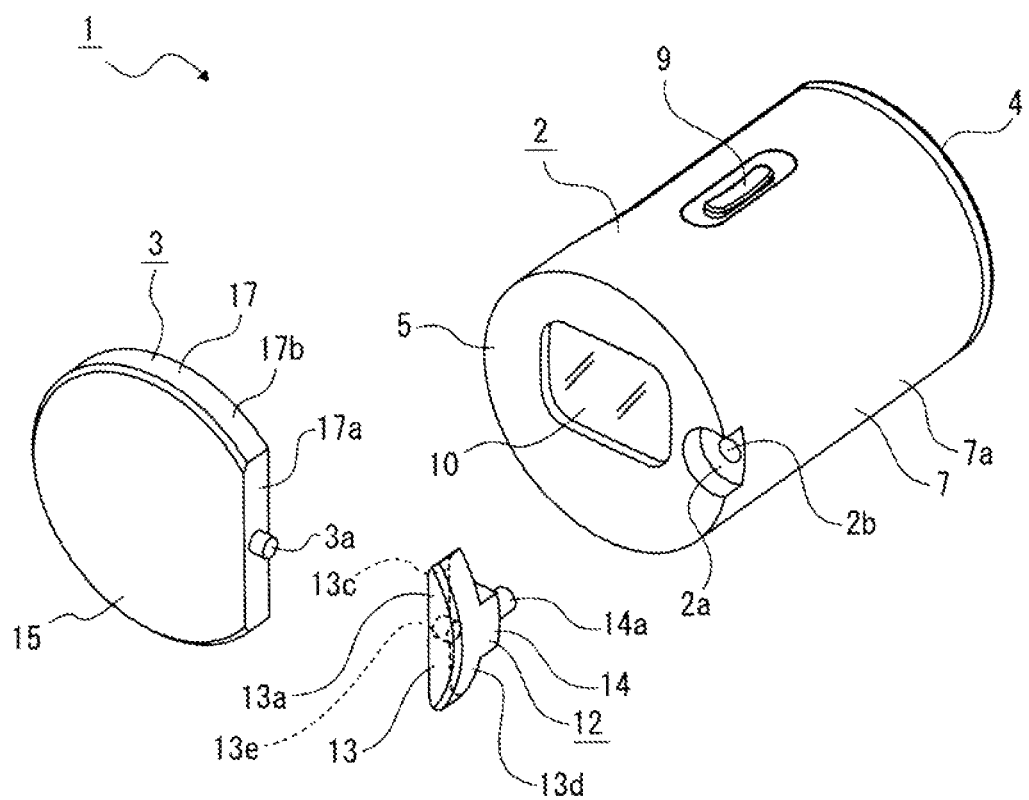
FIG. 11 is a perspective view showing by exploding the cap body and a support mechanism.
Figure 12:
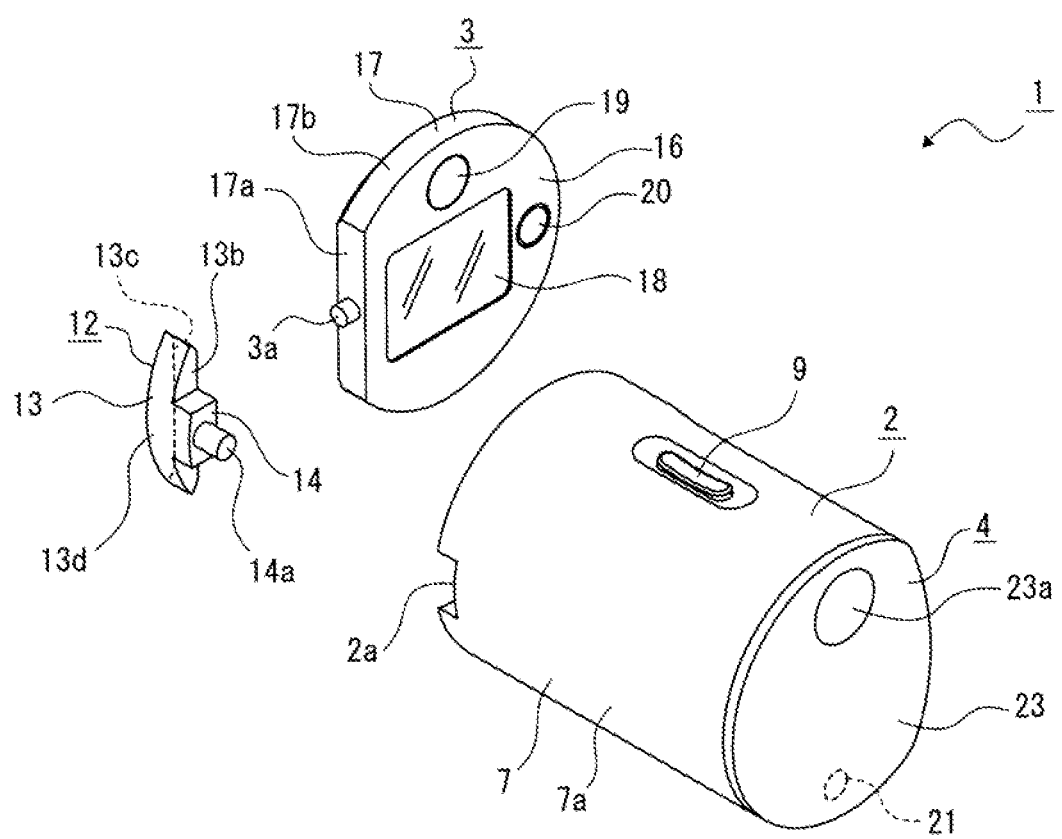
FIG. 12 is a perspective view showing by exploding the cap body and the support mechanism viewed from a different direction from the direction in FIG. 11.

An arranged recess 2a opened in the forward and lateral directions is formed on the front end of the apparatus body 2 and a connecting hole 2b opened in the forward direction is formed in the arranged recess 2a (see FIGS. 11 and 12).

The cap body 3 is rotatably supported on the apparatus body 2 via a support mechanism 12 functioning as a rotation mechanism. The support mechanism 12 includes a connecting portion 13 and a protruding portion 14 protruding in the backward direction from the connecting portion 13.

The connecting portion 13 includes a front surface 13a, a rear surface 13b, a first side surface 13c as a flat surface, and a second side surface 13d as a circular surface and the first side surface 13c is formed in a rectangular shape. Both ends in the longitudinal direction of the first side surface 13c and both ends in the circumferential direction of the second side surface 13d are connected in the connecting portion 13. A support hole 13e opened on the first side surface 13c is formed in the connecting portion 13.

The protruding portion 14 is provided with a first fulcrum shaft 14a protruding in the backward direction.

The support mechanism 12 is connected to the apparatus body 2 by the protruding portion 14 being inserted into the arranged recess 2a and the first fulcrum shaft 14a being inserted into the connecting hole 2b and is made rotatable around the first fulcrum shaft 14a with respect to the apparatus body 2 using the first fulcrum shaft 14a as a fulcrum.

An example in which the first fulcrum shaft 14a is provided in the support mechanism 12 and the connecting hole 2b into which the first fulcrum shaft 14a is inserted is formed in the apparatus body 2 is shown above, but conversely, the connecting hole may be formed in the support mechanism 12 and the first fulcrum shaft inserted into the connecting hole may be provided in the apparatus body 2.

The cap body 3 is rotatably supported on the apparatus body 2 via the support mechanism 12 between the closed position (see FIG. 1) where the imaging lens 10 of the apparatus body 2 is closed and the open position (see FIGS. 2 and 3) where the imaging lens 10 is opened.

The cap body 3 is formed in a substantial disk shape and surfaces on both sides in the thickness direction are formed as a front-side outside surface 15 and a display arrangement surface 16 (see FIGS. 11 and 12). In the cap body 3, a portion of a circumferential surface (outer circumferential surface) 17 is formed as a plane portion 17a and a portion of the circumferential surface 17 other than the plane portion 17a is formed as a circular surface portion 17b. The cap body 3 is formed such that the diameter of the circular surface portion 17b is that same as that of the lens arrangement surface 5 in the apparatus body 2.

The cap body 3 is provided with a second fulcrum shaft 3a protruding from the plane portion 17a. The second fulcrum shaft 3a is provided by allowing to extend in a direction orthogonal to the optical axis direction.

A display 18 is provided on the side of the display arrangement surface 16 of the cap body 3. For example, a recording button 19 and a playback button 20 are arranged as operation buttons on the display arrangement surface 16 around the display 18.

The cap body 3 is connected to the support mechanism 12 by the second fulcrum shaft 3a being inserted into the support hole 13e and is made rotatable around the second fulcrum shaft 3a with respect to the apparatus body 2 via the support mechanism 12 using the second fulcrum shaft 3a as a fulcrum.

While the cap body 3 is in the closed position, the display 18 is in an opposed state to the imaging lens 10 by pointing to the side of the apparatus body 2 (see FIG. 1).

Figure 7:
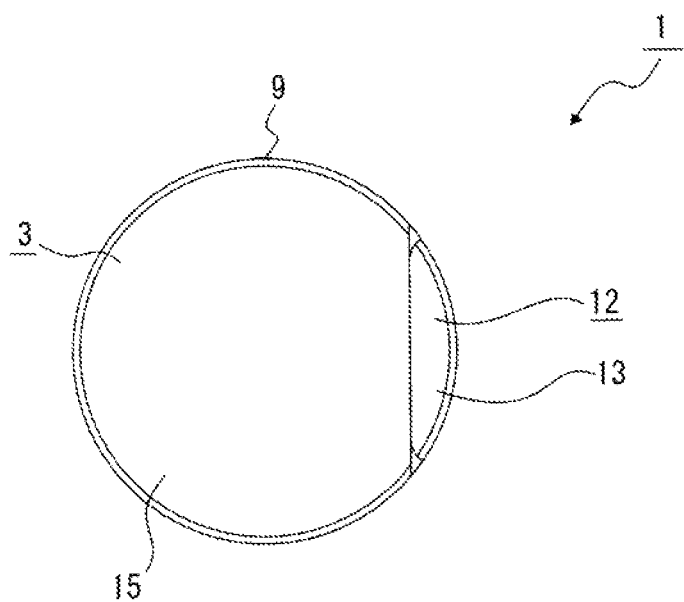
FIG. 7 is a front view.
Figure 8:
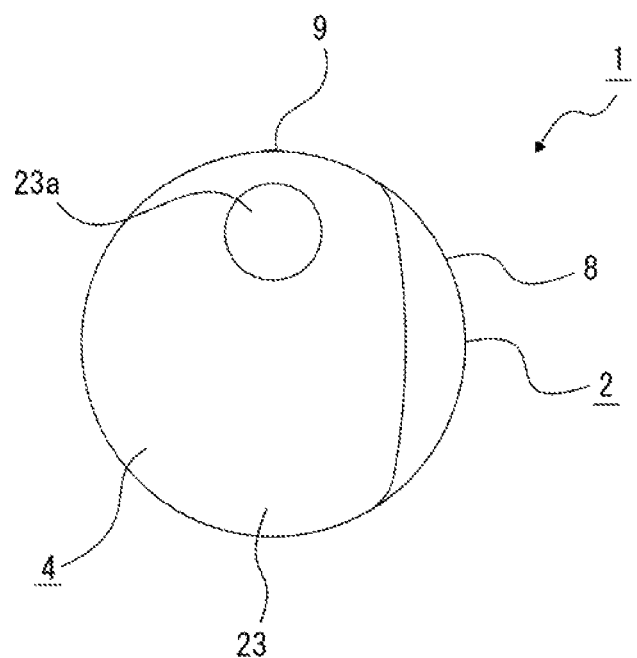
FIG. 8 is a rear view.
Figure 9:
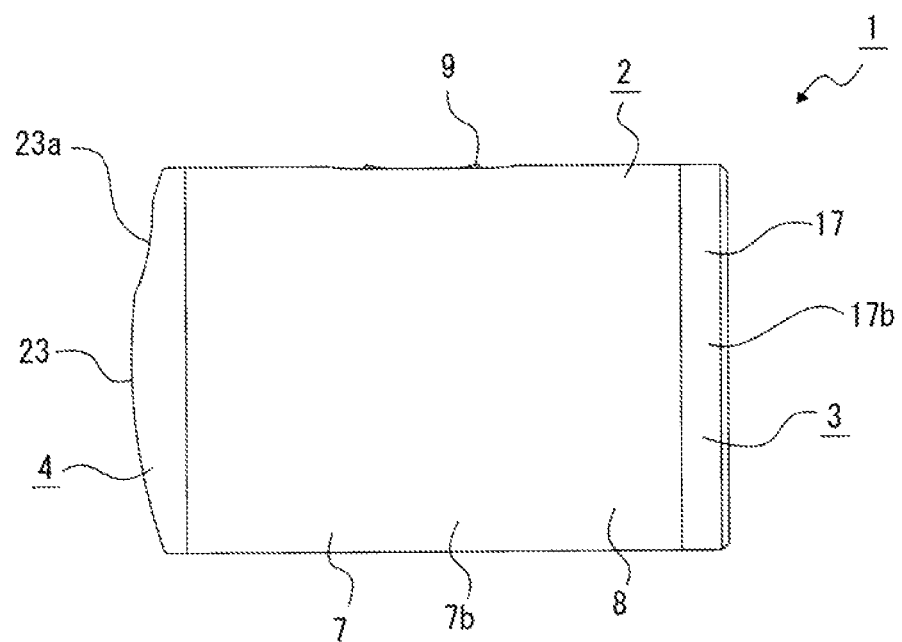
FIG. 9 is a bottom view.

The first side surface 13c of the support mechanism 12 and the plane portion 17a of the cap portion 3 are positioned opposite to each other in the left and right direction in the closed position and the second side surface 13d of the support mechanism 12 and the circular surface portion 17b of the cap body 3 are positioned consecutively (see FIGS. 1 and 7). Therefore, a disk-like shape is formed by the cap body 3 and the connecting portion 13 of the support mechanism 12 and the outer circumference of the disk-like shape matches the outer circumference of the lens arrangement surface 5 in the apparatus body 2.

The outer circumference of the lens arrangement surface 5 of the apparatus body 2 and the outer circumference of the display arrangement surface 16 of the cap body 3 are matched in the forward and backward direction (optical axis direction) in the closed position as described above and therefore, the cap body 3 does not protrude to the outer side of the apparatus body 2 in the closed position and the imaging apparatus 1 can be made smaller in size.

The cap body 3 is formed in a plane shape in which the thickness direction of the cap body matches the thickness direction of the display 18 and therefore, the imaging lens 10 is opened/closed by the cap body 3 in the plane shape and the imaging apparatus 1 can be made smaller in size.

The cap body 3 is rotated between the closed position where the imaging lens 10 is closed and the open position where the imaging lens 10 is opened by using the first fulcrum shaft 14a as a fulcrum and the main power supply of the imaging apparatus 1 is turned on when the cap body 3 is rotated from the closed position to the open position and the main power supply of the imaging apparatus 1 is turned off when the cap body 3 is rotated from the open position to the closed position.

Thus, the main power supply is turned on when the cap body 3 is rotated from the closed position to the open position in the imaging apparatus 1 and therefore, there is no need to perform an operation to turn on the main power supply and the usability of the imaging apparatus 1 can be improved and also there is no need to provide a power button and therefore, the manufacturing cost of the imaging apparatus 1 can be reduced by decreasing the number of components.

Figure 2:
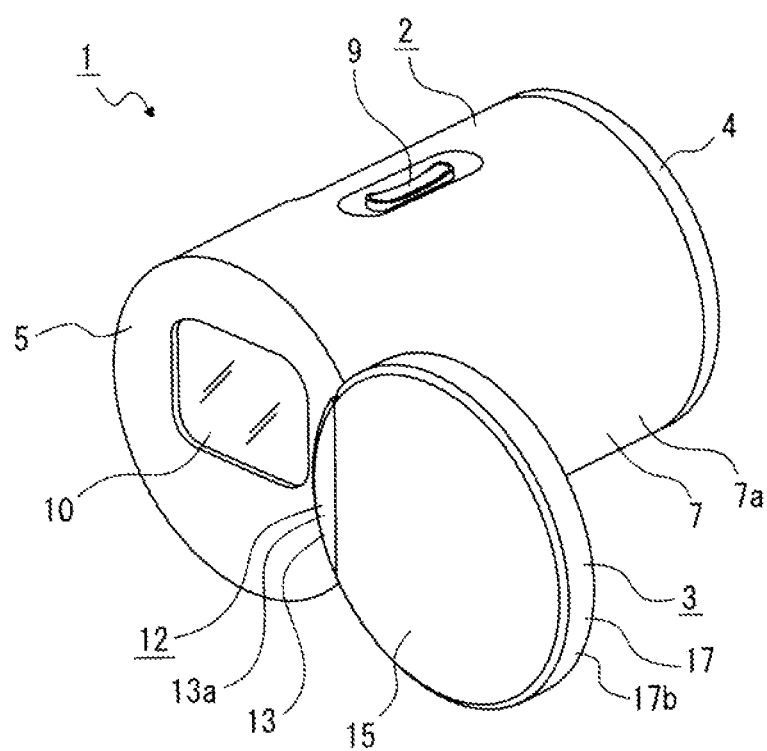
FIG. 2 is a perspective view showing the state in which the cap body is rotated to an open position.
Figure 3:
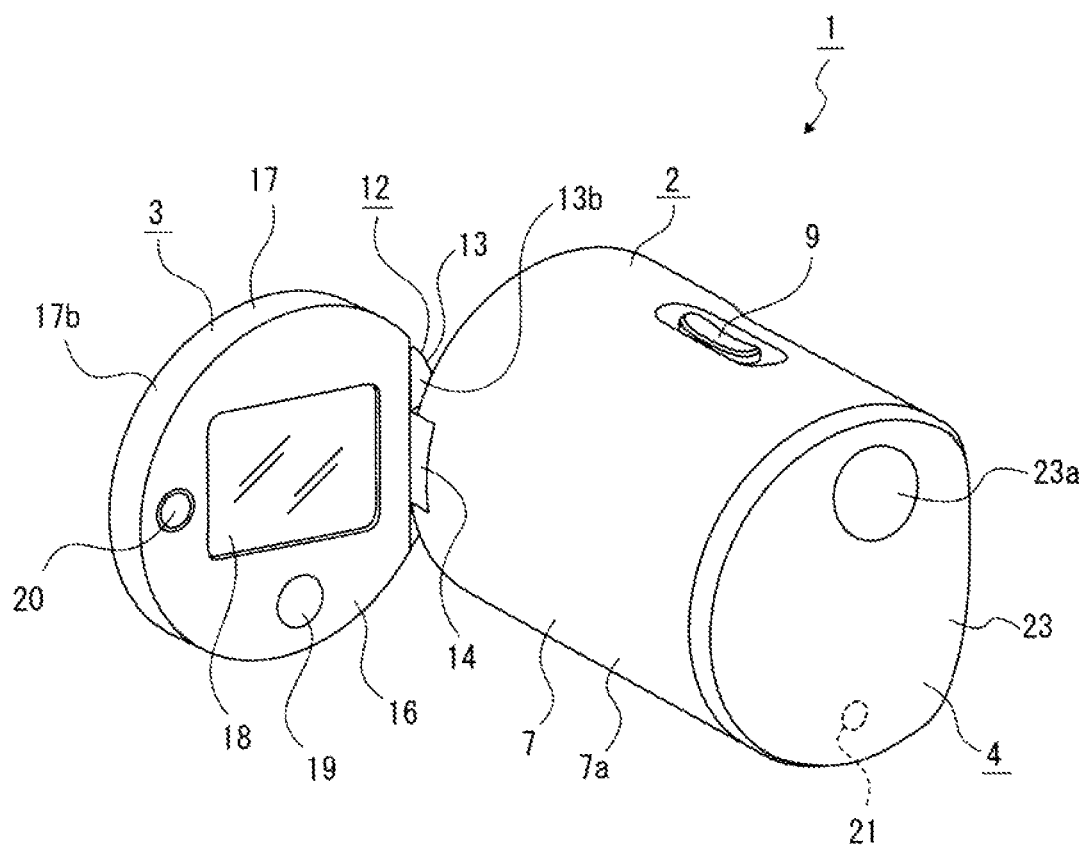
FIG. 3 is a perspective view showing the state in which the cap body is rotated to the open position viewed from a different direction from the direction in FIG. 2.
Figure 4:
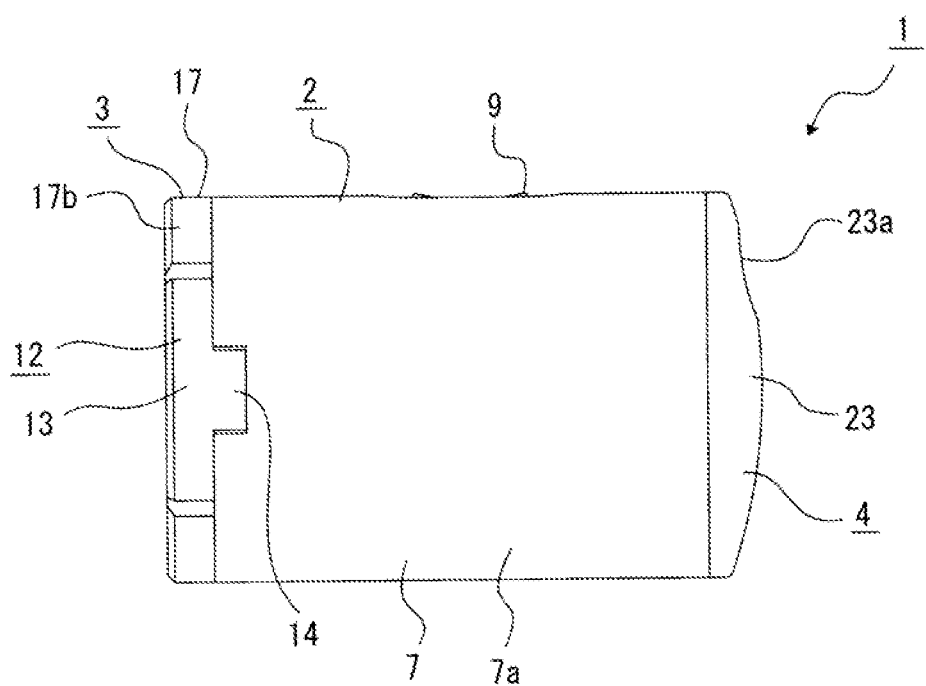
FIG. 4 is a side view of one side.
Figure 5:
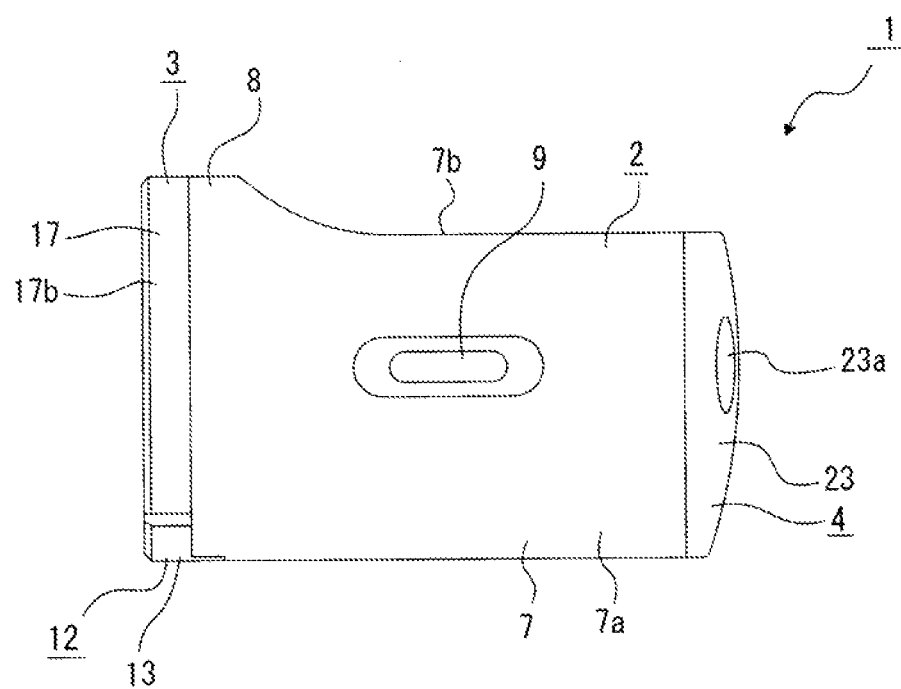
FIG. 5 is a plan view.
Figure 6:
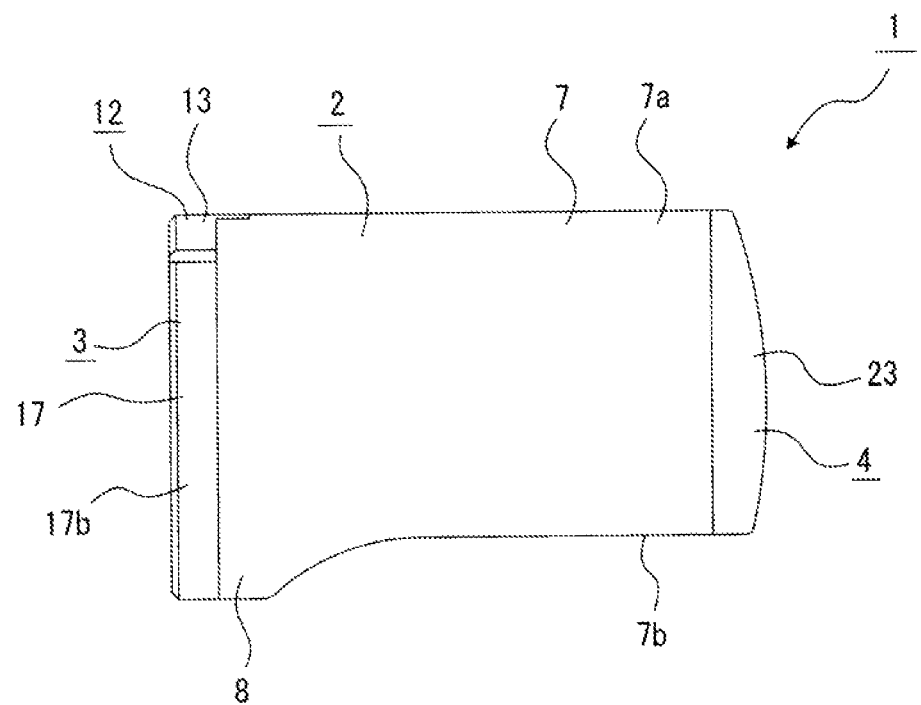
FIG. 6 is a side view of the other side.

The imaging lens 10 and the display 18 are closed while the cap body 3 is in the closed position (see FIG. 1) and the imaging lens 10 and the display 18 are opened while the cap body 3 is in the open position (see FIGS. 2 and 3).

Figure 13:
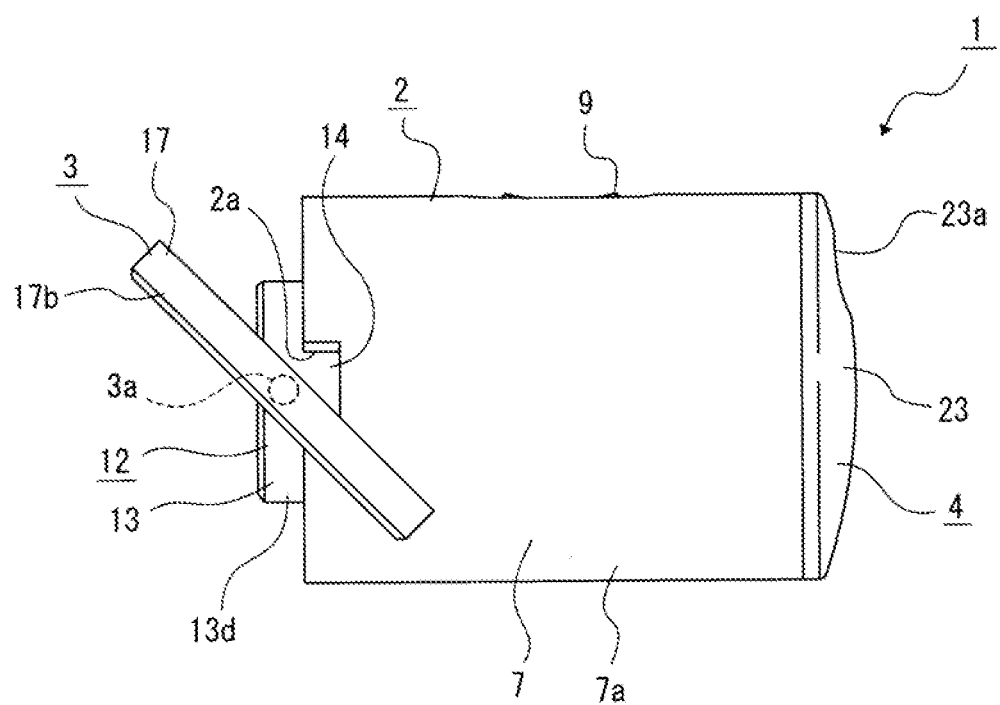
FIG. 13 is a side view showing the state in which the cap body is rotated in one direction using a second fulcrum shaft as a fulcrum in the open position.
Figure 14:
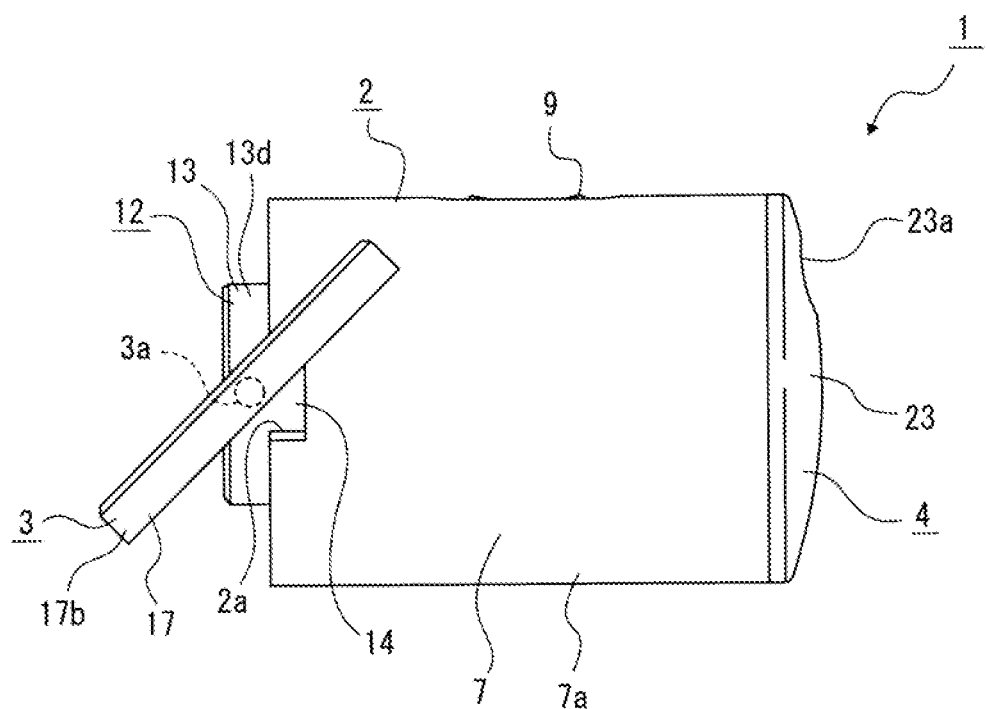
FIG. 14 is a side view showing the state in which the cap body is rotated in the other direction using the second fulcrum shaft as the fulcrum in the open position.

While in the open position, the cap body 3 is made rotatable with respect to the apparatus body 2 using the second fulcrum shaft 3a as a fulcrum (see FIGS. 13 and 14). Therefore, the cap body 3 is made rotatable around the first fulcrum shaft 14a extending in the optical axis direction and also made rotatable around the second fulcrum shaft 3a extending in a direction orthogonal to the optical axis direction. The cap body 3 is enabled to rotate around the second fulcrum shaft 3a by, for example, 360 degrees.

An example in which the second fulcrum shaft 3a is provided in the cap body 3 and the support hole 13e into which the second fulcrum shaft 3a is inserted is formed in the support mechanism 12 is shown above, but conversely, the support hole may be formed in the cap body 3 and the second fulcrum shaft 3a inserted into the support hole may be provided in the support mechanism 12.

The cover body 4 is rotatably supported on the apparatus body 2 between a closing position where the battery insertion hole 6a formed on the battery insertion surface 6 of the apparatus body 2 is closed (see FIG. 8) and an opening position where the battery insertion hole 6a is opened (see FIG. 10). The cover body 4 is connected by a connecting axis 21 extending forward and backward along the apparatus body 2 and is rotated around the connecting axis 21.

The cover body 4 is formed in a plate shape of the same shape and size as those of the battery insertion surface 6 of the apparatus body 2 and the thickness direction thereof is set to the forward and backward direction. The front surface of the cover body 4 is formed as an opposed surface 22 and the rear surface of the cover body 4 is formed as a rear-side outside surface 23. An operation recess 23a is formed on the rear-side outside surface 23.

Figure 15:
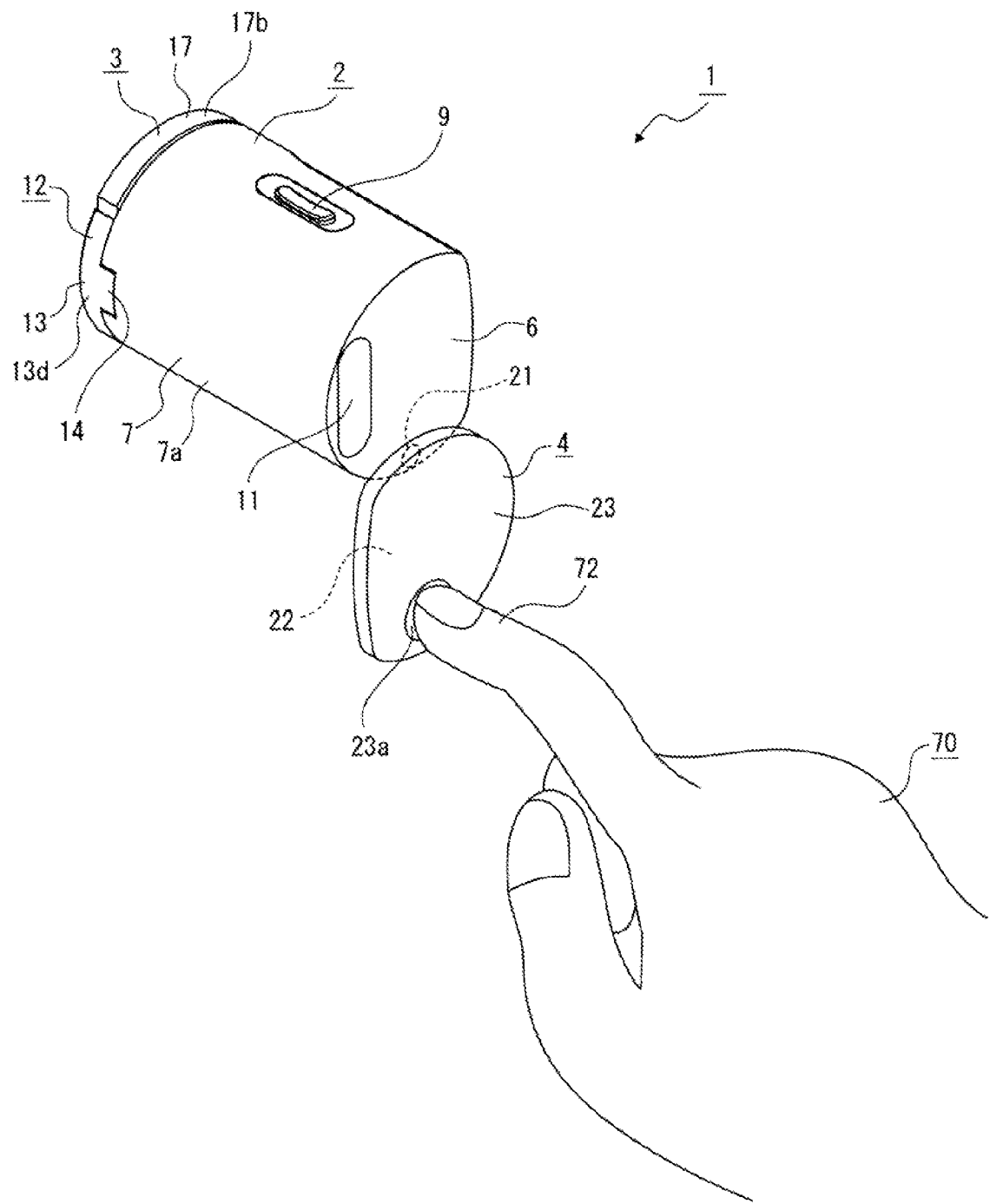
FIG. 15 is a perspective view showing the state in which the cover body is rotated.
Figure 16:
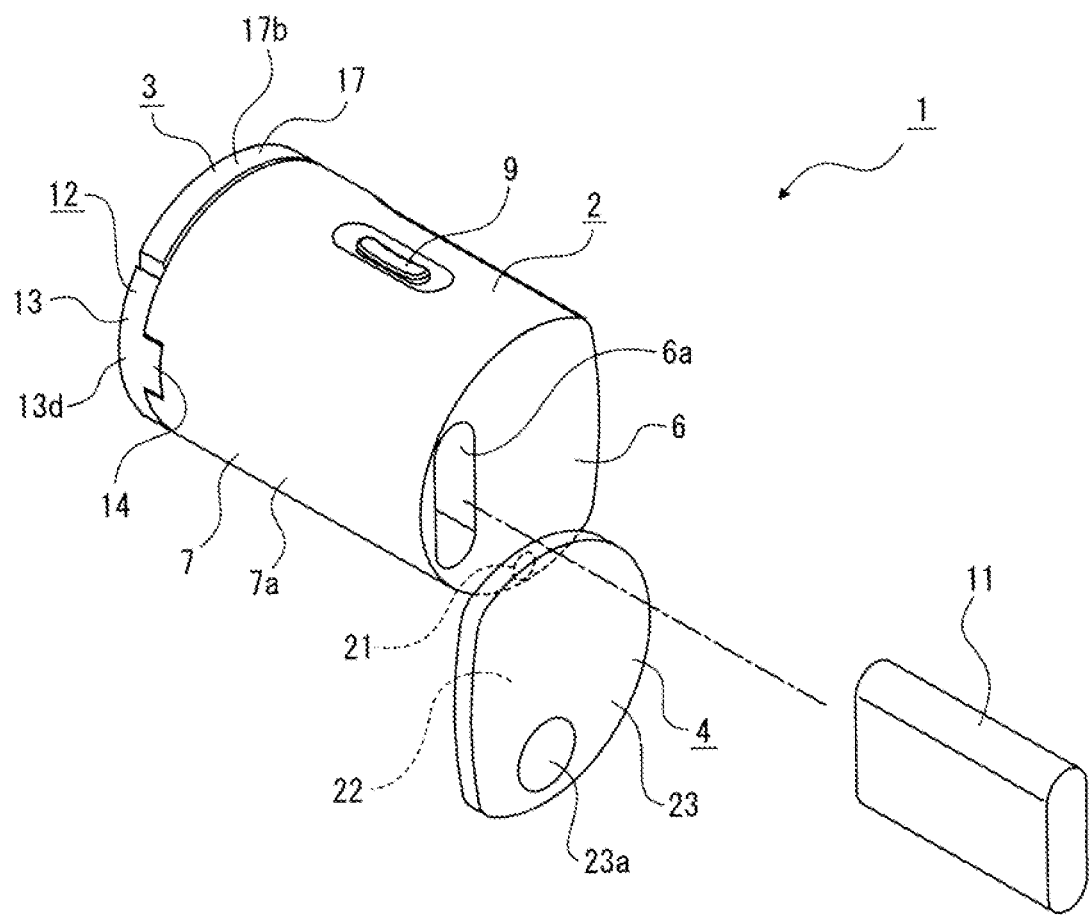
FIG. 16 is a perspective view showing the state in which a battery insertion hole is open after the cover body being rotated together with a battery.

The user can rotate the cover body 4 between the closing position and the opening position by inserting a finger into the operation recess 23a (see FIG. 15). Therefore, the cover 4 can easily be rotated to improve operability. The battery 11 can be inserted into or removed from the battery insertion hole 6a while the cover body 4 is rotated to the opening position (see FIG. 16) and the battery insertion hole 6a and the battery 11 inserted into the battery insertion hole 6a are closed while the cover body 4 is rotated to the closing position (see FIG. 8).

Because the cover body 4 that opens/closes the battery insertion hole 6a is provided in the imaging apparatus 1, the battery insertion hole 6a can be opened/closed when necessary and the battery 11 can be prevented from falling from the apparatus body 2 and also the battery 11 can be protected.

Because the cover body 4 is moved with respect to the apparatus body 2 by the cover body being rotated, the battery insertion hole 6a is opened/closed by a simple operation of the cover body 4 to be able to improve the usability of the imaging apparatus 1 and also insertion work of the battery 11 into the apparatus body 2 and removal work of the battery 11 from inside the apparatus body 2 can easily be performed.

Further, the cover body 4 is configured to be rotatable in the same direction as the rotation direction between the closed position and the open position of the cap body 3 and therefore, the operation direction to rotate the cap body 3 and the operation direction to rotate the cover body 4 match so that the usability of the imaging apparatus 1 can be improved by improved operability.

The cover body 4 is positioned in the closing position such that the opposed surface 22 is opposite to the battery insertion surface 6 in the forward and backward direction. In the closing position, the outer circumference of the cover body 4 matches the outer circumference of the battery insertion surface 6.

Thus, the outer circumference of the cover body 4 and the outer circumference of the battery insertion surface 6 match in the closing position and therefore, the cover body 4 does not protrude to the outer side of the apparatus body 2 in the closing position and the imaging apparatus 1 can be made smaller in size.

The cover body 4 is formed in a plane shape whose thickness direction matches the forward and backward direction and therefore, the battery insertion hole 6a is opened/closed by the cover body 4 in the plane shape and the imaging apparatus 1 can be made smaller in size.

Further, in the imaging apparatus 1, a rotation mechanism is provided as the support mechanism 12 and the cap body 3 is rotatably supported on the apparatus body 2.

Thus, the cap body 3 is moved by being rotated with respect to the apparatus body 2 and therefore, the imaging lens 10 and the display 18 are opened/closed by a simple operation of the cap body 3 and the usability thereof can be improved.

Further, the first fulcrum shaft 14a extending on the optical axis direction of the imaging lens 10 and the second fulcrum shaft 3a extending in a direction orthogonal to the optical axis direction are provided and the cap body 3 is rotated around the first fulcrum shaft 14a using the first fulcrum shaft 14a as a fulcrum and also rotated around the second fulcrum shaft 3a using the second fulcrum shaft 3a as a fulcrum.

Thus, the cap body 3 is rotated in two different directions with respect to the apparatus body 2 and therefore, the degree of flexibility in orientation of the display 18 is increased and further improvements of usability can be achieved.

<Usage State>

Next, each usage state of the imaging apparatus 1 will be described. Usage states of the imaging apparatus 1 include a shooting state and a playback state. For the shooting state, the normal shooting mode, high-angle shooting mode, low-angle shooting mode, or self shooting mode is set and the playback mode is set for the playback state. Incidentally, the imaging apparatus 1 may be configured such that only the shooting mode and the playback mode are recognized (detected) and a state enabling shooting or playback is set. In this case, the normal shooting state, high-angle shooting state, low-angle shooting state, or self shooting state can be set by the cap body 3 being rotated by the user to set the direction of the display 18 to a desired direction in the shooting mode.

Figure 17:
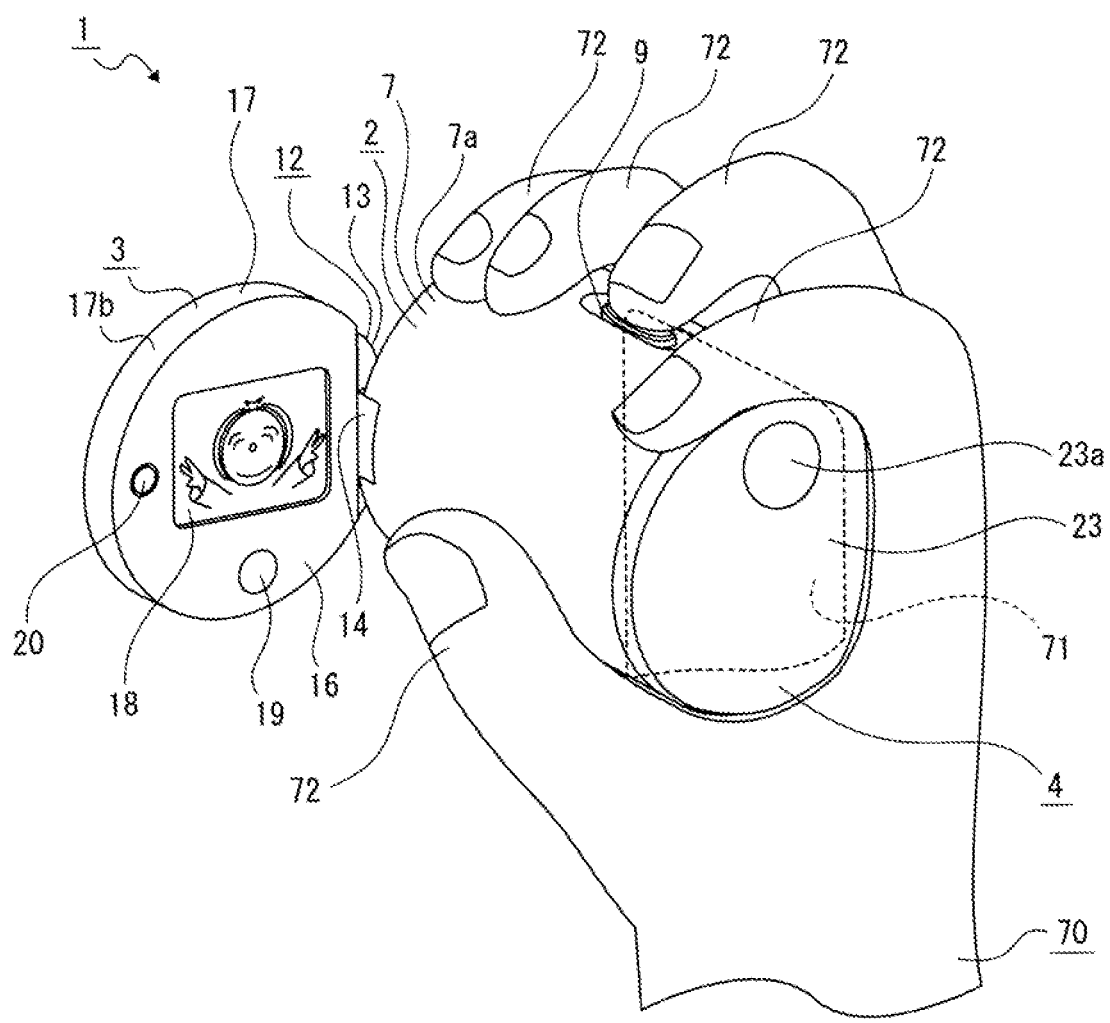
FIG. 17 is a perspective view showing the state of shooting in a normal shooting mode.

The normal shooting mode is set by the cap body 3 being rotated from the closed position to the open position (see FIG. 17). At this point, the user shoots by pressing a palm 71 against the gripping surface portion 7b of the outer circumferential surface 7 after putting a hand 70 over the apparatus body 2 and wrapping the coating surface portion 7a in fingers 72, 72, . . . .

Because the gripping surface portion 7b in a substantially plane shape against which the palm 71 is pressed and the coating surface portion 7a in a curved surface shape wrapped in the fingers 72, 72, . . . are formed on the apparatus body 2 over which the hand 70 is put for shooting, a stable gripped state of the apparatus body 2 is ensured and therefore, shooting is made easier and also the up and down direction and the left and right direction (panning/tilting) can easily be determined.

The zoom knob 9 is arranged on the outer circumferential surface 7 of the apparatus body 2 and therefore, the zoom knob 9 can be operated while a stable gripped state of the apparatus body 2 is ensured and improvements of operability of the zoom knob 9 can be achieved.

Figure 18:
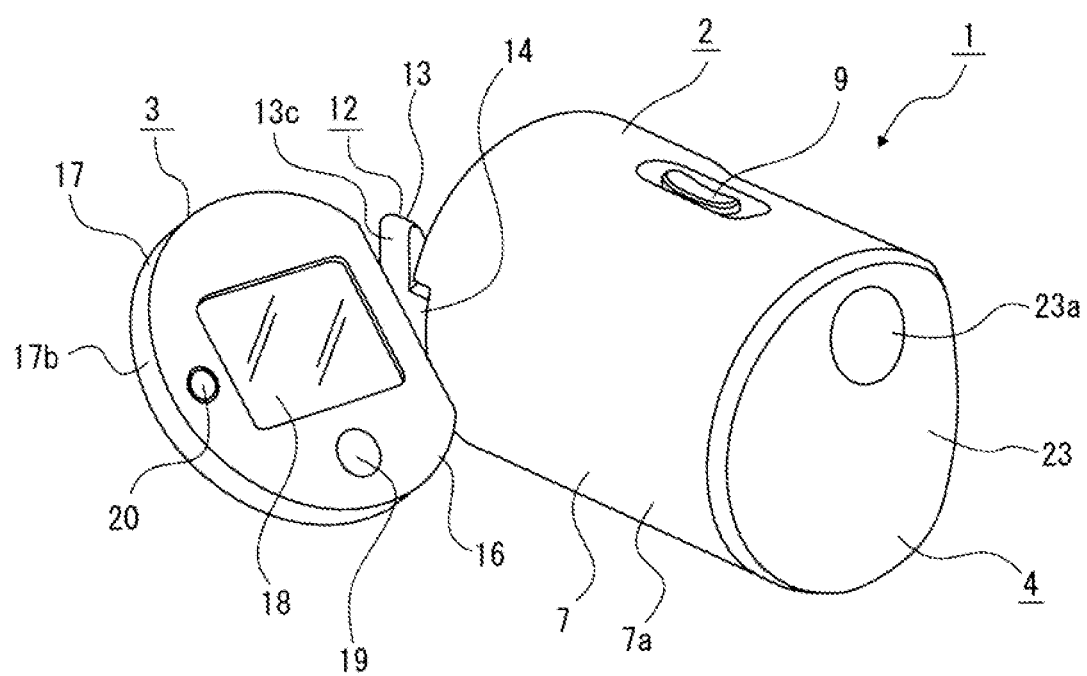
FIG. 18 is a perspective view showing the state in which a low-angle shooting mode is set.

The low-angle shooting mode is set by rotating the cap body 3 using the second fulcrum shaft 3a as a fulcrum such that the display 18 points obliquely above in the open position (see FIG. 18). The low-angle shooting is enabled by rotating the cap body 3 in the open position as described above and therefore, the choice of shooting is increased by a simple operation and the usability of the imaging apparatus 1 can be improved.

Figure 19:
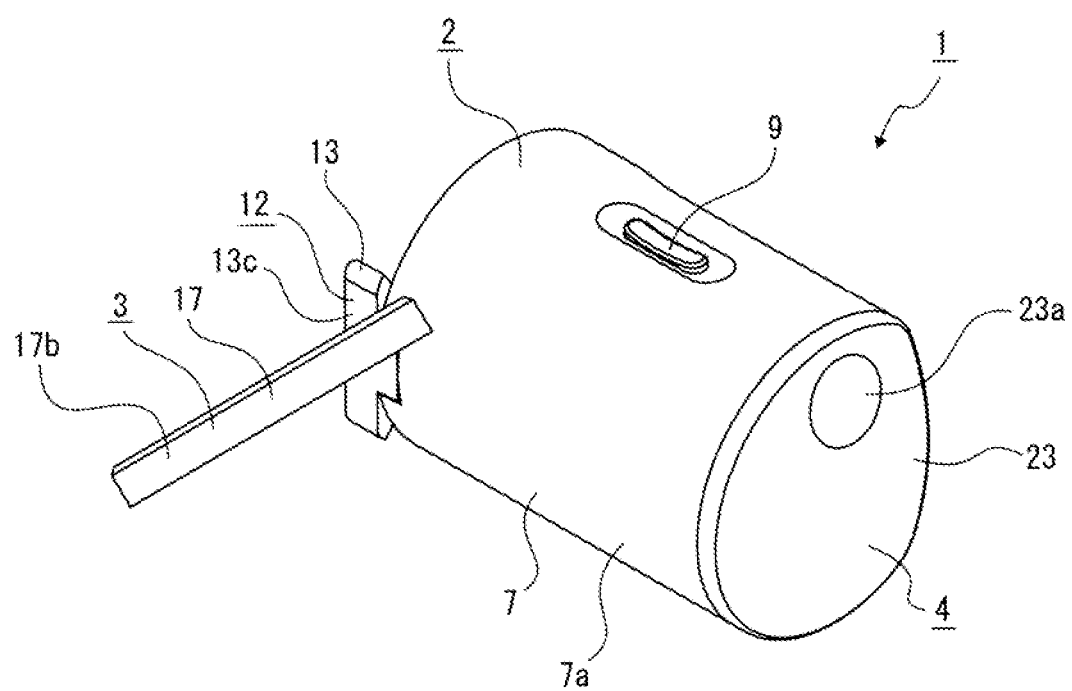
FIG. 19 is a perspective view showing the state in which a high-angle shooting mode is set.

The high-angle shooting mode is set by rotating the cap body 3 using the second fulcrum shaft 3a as a fulcrum such that the display 18 points obliquely below in the open position (see FIG. 19). The high-angle shooting is enabled by rotating the cap body 3 in the open position as described above and therefore, the choice of shooting is increased by a simple operation and the usability of the imaging apparatus 1 can be improved.

Figure 20:
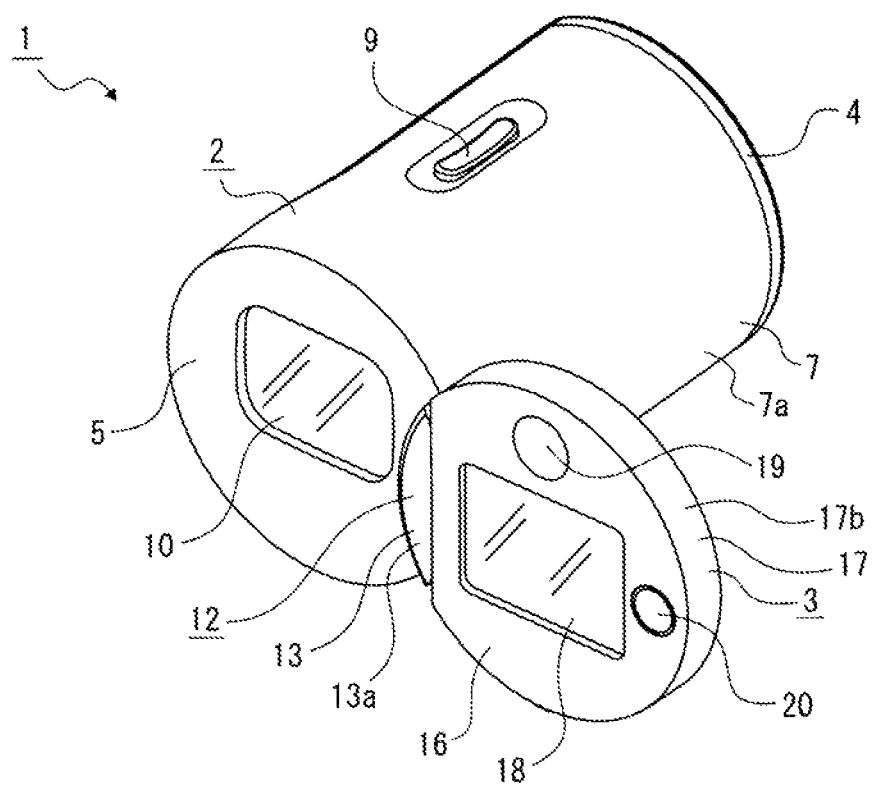
FIG. 20 is a perspective view showing the state in which a self shooting mode is set.

The self shooting mode is set by rotating the cap body 3 using the second fulcrum shaft 3a as a fulcrum such that the display 18 points forward in the open position (see FIG. 20). At this point, the direction of the apparatus body 2 is set such that the imaging lens 10 points toward the cameraman. The self shooting is enabled by rotating the cap body 3 in the open position and therefore, the choice of shooting is increased by a simple operation and the usability of the imaging apparatus 1 can be improved.

In the self shooting mode, reversal control of images to be displayed in the display 18 is exercised and images that are correctly oriented vertically are played back in the display 18. In the self shooting mode, in addition to the vertical reversal control of images to be displayed in the display 18, left and right reversal control may also be exercised. The cameraman can understand the physical relationship more easily by the left and right reversal control of images being exercised and the usability is improved.

In the normal shooting mode, high-angle shooting mode, low-angle shooting mode, and self shooting mode described above, a subject is shot by operating the recording button 19 provided in the cap body 3.

The recording button 19 is arranged on the display arrangement surface 16 where the display 18 is provided and therefore, the recording button 19 can be operated while the display 18 on which a subject is displayed is visually recognized, a shooting operation can easily be performed, and improvements of operability of the imaging apparatus 1 can be achieved.

Figure 21:
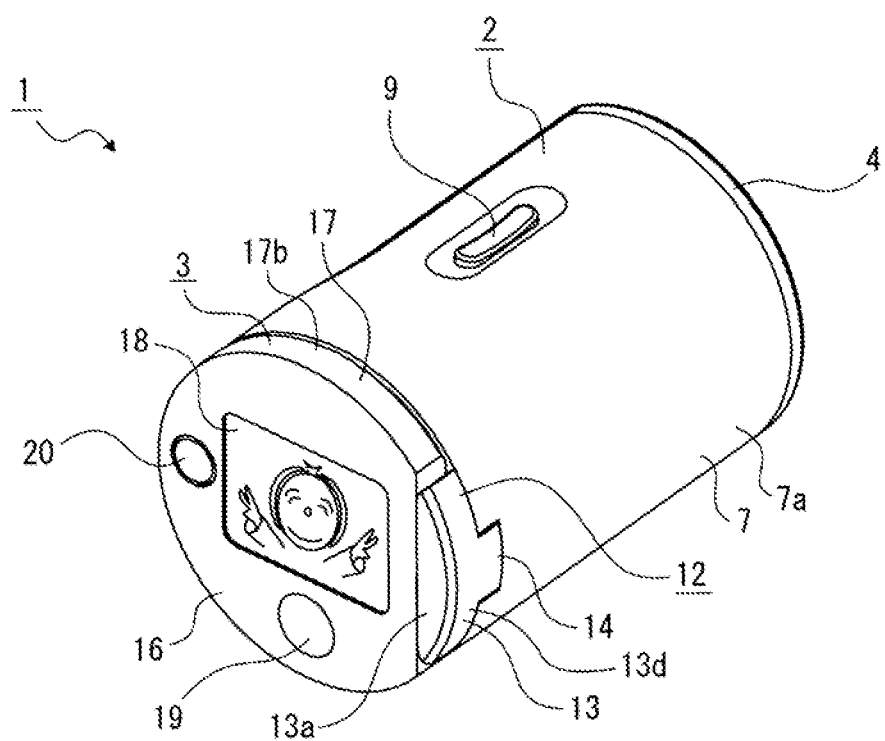
FIG. 21 is a perspective view showing the state in which a playback mode is set.

The playback mode is set by rotating the cap body 3 using the second fulcrum shaft 3a as a fulcrum such that the display 18 points forward in the open position and then rotating the cap body 3 from the open position to the closed position using the first fulcrum shaft 14a as a fulcrum (see FIG. 21). In the playback mode, therefore, the cap body 3 is set to a non-opposed state in which the display 18 is not opposite to the imaging lens 10 by pointing to the opposite side of the apparatus body 2.

In the playback mode, reversal control of images to be displayed in the display 18 is exercised and images that are correctly oriented vertically are played back in the display 18.

Also in the imaging apparatus 1, with the cap body 3 being rotated to the closed position in a non-opposed state in which the display 18 is not opposite to the imaging lens 10 by pointing to the opposite side of the apparatus body 2, a state in which operating the recording button 19 is disabled is set and also a state in which played-back images can be displayed on the display 18 is set.

Thus, the playback mode is set without performing any special operation and therefore, the playback mode can easily be set and also the imaging lens 10 that is not used while images are played back is closed by the cap body 3 and therefore, the imaging lens 10 can be protected.

In the playback mode, captured images are displayed on the display 18 by the playback button 20 provided on the cap body 3 being operated.

The playback button 20 is arranged on the display arrangement surface 16 where the display 18 is provided and therefore, the playback button 20 can be operated while the display 18 on which a captured image is displayed is visually recognized, a playback operation can easily be performed, and improvements of operability of the imaging apparatus 1 can be achieved.

Examples in which a predetermined function is executed by operating the recording button 19 or the playback button 20 are shown above, but for example, the display 18 can also be configured to be formed as an operation screen such as a touch panel so that each function such as shooting and playback is executed in accordance with an operation after each predetermined operation being performed on the display 18.

<Internal Configuration of the Imaging Apparatus>

Figure 22:
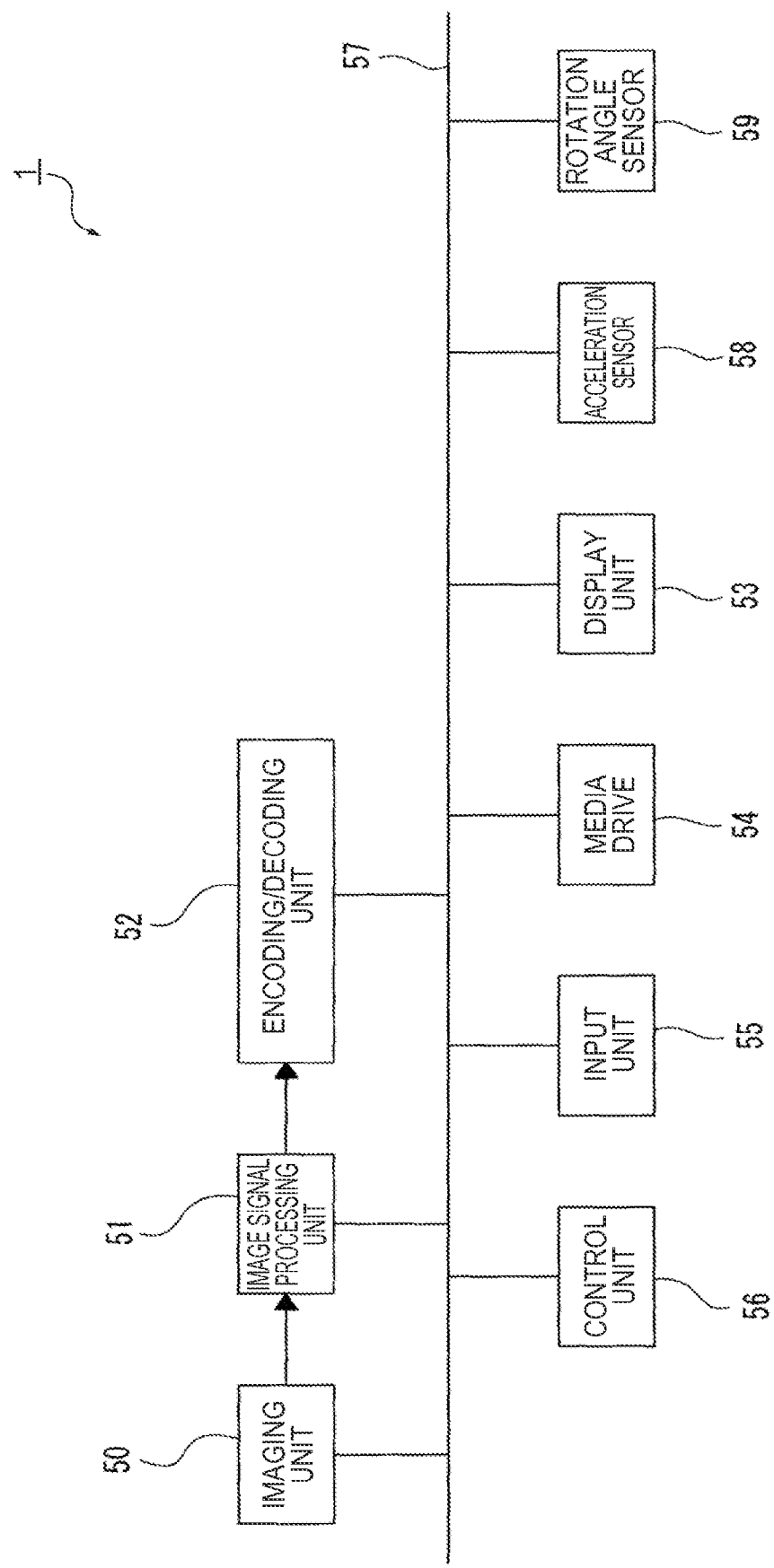
FIG. 22 is a block diagram showing an internal configuration.

Next, the internal configuration (circuit configuration) of the imaging apparatus 1 will be described (see FIG. 22).

An imaging unit 50, an image signal processing unit 51, an encoding/decoding unit 52, a display unit 53, a media drive 54, an input unit 55, a control unit 56, a bus 57, an acceleration sensor 58, and a rotation angle sensor 59 are provided inside the imaging apparatus 1. Each unit excluding the bus 57 is mutually connected via the bus 57 to exchange various kinds of data control signals between each unit.

The imaging unit 50 includes a lens unit having each lens including the imaging lens 10, an imaging device, for example, charge coupled device (CCD) or complementary metal oxide semiconductor (CMOS) that converts subject light obtained via the lens unit into an electric signal (imaging signal) through photoelectric conversion, a sample hold/automatic gain control (AGC) circuit that makes gain adjustments of an image signal obtained by the imaging device or shapes the waveform of the imaging signal, and a video A/D converter and obtains captured image data as digital data.

The imaging unit 50 has a function to adjust the focal length (focus), the angle of view (zoom), the shutter speed, the diaphragm and the like based on the control of the control unit 56.

The image signal processing unit 51 performs various kinds of image signal processing, for example, gradation correction processing, shading correction processing, high area correction (contour correction) processing, camera shake compensation processing and the like on captured image data obtained by the imaging unit 50.

The encoding/decoding unit 52 performs compression processing of captured image data on which image signal processing has been performed by the image signal processing unit 51 and decompression processing of captured image data on which the compression processing has been performed. As the compression/decompression mode, compression/decompression processing based on a predetermined still image format, for example, the joint photographic experts group (JPEG) format is performed on still images and compression/decompression processing based on a predetermined moving image format, for example, the moving picture experts group (MPEG) format or advanced video codec high definition (AVCHD) format is performed on moving images.

The display unit 53 has the display 18 and displays various kinds of information, for example, captured images based on the control of the control unit 56.

The media drive 54 includes a recording and playback circuit/mechanism for a semiconductor memory such as a flash memory or a recording medium such as a magnetic disk, optical disk, magneto-optical disk and the like. The media drive 54 records various kinds of data such as compressed captured image data in moving image format or still image format obtained by the encoding/decoding unit 52 based on the control of the control unit 56 on a recording medium or reads various kinds of data such as compressed captured image data recorded on a recording medium.

The input unit 55 includes operation units such as the zoom knob 9, the recording button 19, the playback button 20 and the like for the cameraman to do input of various operations into the imaging apparatus 1 and detects a user's input operation to convey the information (operation input information) in accordance with the input operation to the control unit 56. If a touch panel is provided as an operation unit, the touch panel is included in the input unit 55.

The control unit 56 is formed of a microcomputer including a central processing unit (CPU), a Read Only Memory (ROM), a random access memory (RAM) and the like and controls the whole imaging apparatus 1 by performing processing according to a program stored in, for example, the ROM.

For example, the control unit 56 exercises control to cause the encoding/decoding unit 52 to perform still image compression processing on captured image data input from the image signal processing unit 51 in accordance with operation input into the input unit 55 when still images are shot and to cause the media drive 54 to record the compressed captured image data obtained by the above processing in a recording medium.

When moving images are shot, the control unit exercises control to cause the encoding/decoding unit 52 to perform moving image compression processing on captured image data input from the image signal processing unit 51 in accordance with operation input into the input unit 55 and to cause the media drive 54 to record the compressed captured image data obtained by the above processing in a recording medium.

Further, the control unit 56 also exercises control to cause the display unit 53 (display 18) to display images based on captured image data obtained by the image signal processing unit 51 in a shooting state as through images.

The acceleration sensor 58 detects the acceleration of gravity. For example, a three-axis sensor is used as the acceleration sensor 58 and it is known that the direction in which the gravity acts can be detected from a DC component of an acceleration detection signal by the acceleration sensor 58 and the vibration can be detected from an AC component of the acceleration detection signal. When the direction in which the gravity acts is detected by the acceleration sensor 58, for example, the posture of the imaging apparatus 1 is detected by the control unit 56 and the orientation of images displayed on the display 18 is controlled in accordance with the detected posture.

The rotation angle sensor 59 is formed of a rotary encoder or the like and detects the rotation angle of the cap body 3 with respect to the apparatus body 2. As the rotation angle of the cap body 3 with respect to the apparatus body 2, the rotation angle around the first fulcrum shaft 14*a* and the rotation angle around the second fulcrum shaft 3*a* are separately detected. When the rotation angle of the cap body 3 is detected by the rotation angle sensor 59, for example, the orientation of images displayed on the display 18 is controlled by the control unit 56 in accordance with the rotation angle of the cap body 3. Incidentally, only two positions, the closed position and the open position, of the cap body 3 may be detected by the rotation angle sensor 59. In this case, positions may be detected by a mechanical switch or optical switch.

<Control Processing in Each Mode>

Figure 23:
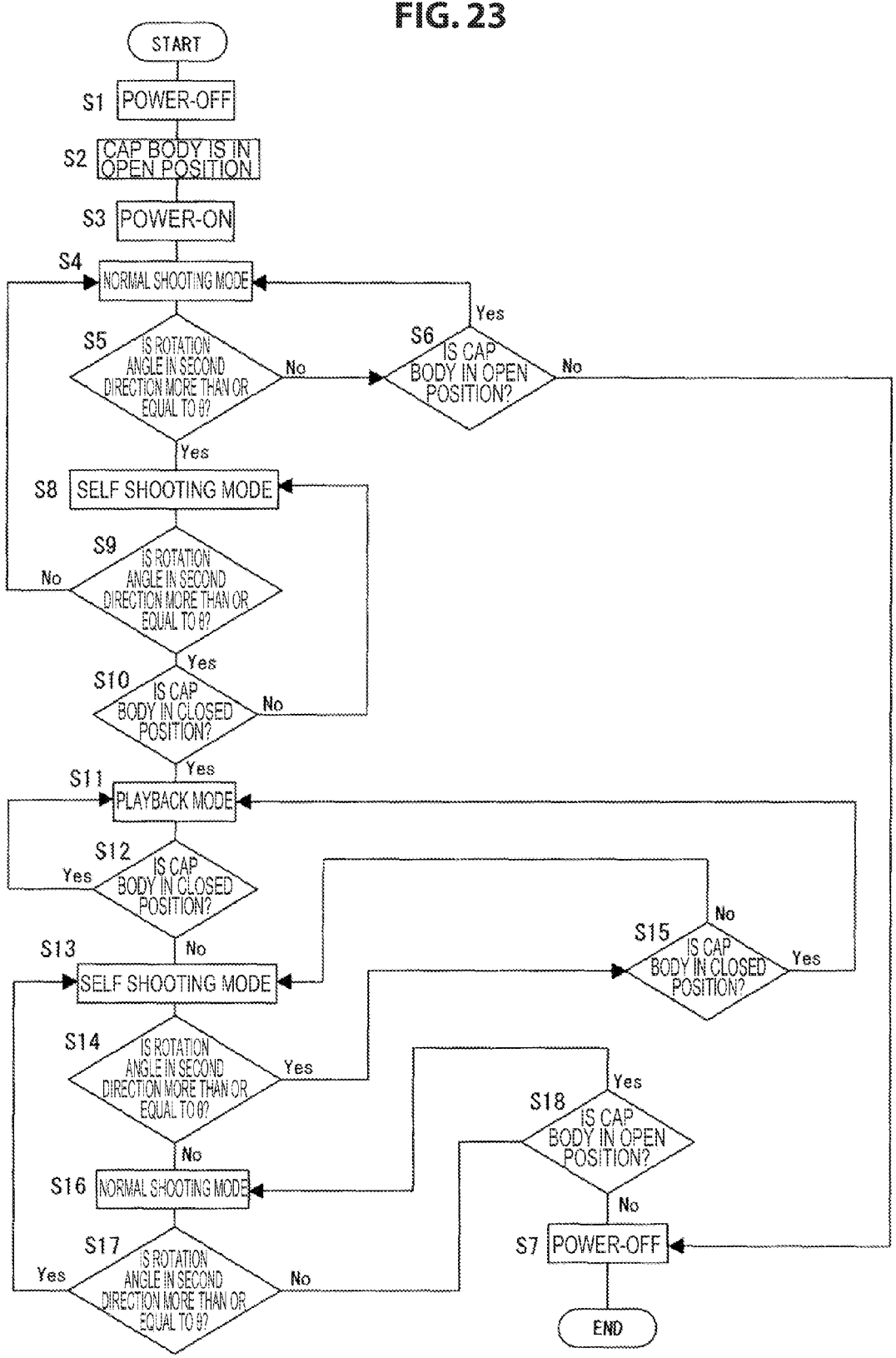
FIG. 23 is a flow chart showing control processing in each mode.

Next, control processing in each mode will be described with reference to the flow chart in FIG. 23. The control processing in each mode is performed by the control unit 56 based on detection results of the acceleration sensor 58 or the rotation angle sensor 59. Each piece of the control processing is performed according to a program stored in, for example, the ROM. In addition, the control processing is performed, for example, at regular intervals.

In the description that follows, the rotation direction of the cap body 3 using the first fulcrum shaft 14*a* as a fulcrum is defined as a first rotation direction and the rotation direction of the cap body 3 using the second fulcrum shaft 3*a* as a fulcrum is defined as a second rotation direction.

The shooting mode shown below is a mode including the normal shooting mode, the high-angle shooting mode, and the low-angle shooting mode.

The main power supply is turned off in a state in which the control processing is started (step S1). However, the imaging apparatus 1 includes a sub-power supply and at this point, the sub-power supply is turned on to perform the processing in step S1.

In step S2, when the rotation of the cap body 3 from the closed position to the open position is detected, the control unit 56 performs the control processing to turn on the main power supply (step S3). The control unit 56 performs the control processing to turn on the main power supply and at the same time, performs the control processing to set the normal shooting mode (step S4). In the imaging apparatus 1, instead of step S1 and step S2, a function that mechanically turns on a power supply switch when the cap body 3 is rotated to the open position may be provided. Conversely, a function that mechanically turns off the power supply switch when the cap body 3 is rotated to the closed position may be provided.

The cap body 3 can be rotated in both of the first rotation direction and the second rotation direction while the normal shooting mode is set and in step S5 that follows, the control unit 56 performs the control processing based on the rotation angle $\theta$ of the cap body 3 rotated to the open position using the second fulcrum shaft 3*a* as a fulcrum. In step S5, when the state in which the cap body 3 is rotated from the closed position to the open position in the first rotation direction, that is, the state in which the display 18 points just in the rear direction is defined as a reference position, if the rotation angle of the cap body 3 in the second direction that is equal to $\theta$ as a predetermined threshold or more is not detected, the control unit 56 performs control processing in step S6.

In step S6, if the cap body 3 is detected being positioned in the open position, the control unit 56 performs the control processing to maintain the setting of the normal shooting mode (step S4). In this case, the setting of the normal shooting mode may be maintained without special control being exercised by the control unit 56. In step S6, if the cap body 3 is not detected being positioned in the open position, the cap body 3 is being rotated to the closed position or has been rotated to the closed position and the control unit 56 performs control processing to turn off the main power supply (step S7). The control processing is terminated by the main power supply being turned off.

In step S5, on the other hand, if the rotation angle of the cap body 3 in the second direction with respect to the reference position that is more than or equal to $\theta$ is detected, the control unit 56 performs control processing in step S8. In step S8, the control unit 56 performs the control processing to set the self shooting mode.

The cap body 3 can be rotated in both of the first rotation direction and the second rotation direction while the self shooting mode is set and in step S9 that follows, the control unit 56 performs control processing based on the rotation angle $\theta$ of the cap body 3 in the second direction with respect to the reference position.

In step S9, if the rotation angle of the cap body 3 in the second direction with respect to the reference position that is more than or equal to $\theta$ is not detected, the control unit 56 performs control processing to set the normal shooting mode.

In step S9, on the other hand, if the rotation angle of the cap body 3 in the second direction with respect to the reference position that is more than equal to $\theta$ is detected, the control unit 56 performs control processing in step S10 that follows.

In step S10, if the cap body 3 is not detected being positioned in the closed position, the control unit 56 performs the control processing to maintain the setting of the self shooting mode (step S8). In this case, the setting of the self shooting mode may be maintained without special control being exercised by the control unit 56.

In step S10, on the other hand, if the cap body 3 is detected being positioned in the closed position, the control unit 56 performs control processing in step S11 that follows. In step S11, the control unit 56 performs the control processing to set the playback mode.

While the playback mode is set, the cap body 3 can be rotated in the first rotation direction and in step S12 that follows, the control unit 56 exercises control based on the rotation position of the cap body 3 in the first direction.

In step S12, if the cap body 3 is detected being positioned in the closed position, the control unit 56 performs the control processing to maintain the setting of the playback mode (step S11). In this case, the setting of the playback mode may be maintained without special control being exercised by the control unit 56.

In step S12, on the other hand, if the cap body 3 is not detected being positioned in the closed position, the control unit 56 performs control processing in step S13 that follows. In step S13, the control unit 56 performs the control processing to set the self shooting mode.

The cap body 3 can be rotated in both of the first rotation direction and the second rotation direction while the self shooting mode is set and in step S14 that follows, the control unit 56 performs the control processing based on the rotation angle θ of the cap body 3 rotated to the open position using the second fulcrum shaft 3*a* as a fulcrum.

In step S14, if the rotation angle of the cap body 3 in the second direction with respect to the reference position that is more than or equal to θ is detected, the control unit 56 performs control processing in step S15 that follows and if the rotation angle of the cap body 3 in the second direction with respect to the reference position that is more than or equal to θ is not detected, the control unit 56 performs control processing in step S16 that follows.

In step S15, if the cap body 3 is not detected being positioned in the closed position, the control unit 56 performs the control processing to maintain the setting of the self shooting mode (step S13). In this case, the setting of the self shooting mode may be maintained without special control being exercised by the control unit 56.

In step S15, on the other hand, if the cap body 3 is detected being positioned in the closed position, the control unit 56 performs control processing to set the playback mode.

In step S16, the control unit 56 performs the control processing to set the normal shooting mode.

The cap body 3 can be rotated in both of the first rotation direction and the second rotation direction while the normal shooting mode is set and in step S17 that follows, the control unit 56 performs the control processing based on the rotation angle θ of the cap body 3 rotated to the open position using the second fulcrum shaft 3*a* as a fulcrum.

In step S17, if the rotation angle of the cap body 3 in the second direction with respect to the reference position that is more than or equal to θ is detected, the control unit 56 performs control processing to set the self shooting mode (step S13).

In step S17, on the other hand, if the rotation angle of the cap body 3 in the second direction with respect to the reference position that is more than or equal to θ is not detected, in step S18 that follows, the control unit 56 performs control processing based on the rotation position of the cap body 3 in the first direction.

In step S18, if the cap body 3 is detected being positioned in the open position, the control unit 56 performs the control processing to maintain the setting of the normal shooting mode (step S16). In this case, the setting of the normal shooting mode may be maintained without special control being exercised by the control unit 56. In step S17, if the cap body 3 is not detected being positioned in the open position, the cap body 3 is being rotated to the closed position or has been rotated to the closed position and the control unit 56 performs the control processing to turn off the main power supply (step S7). The control processing is terminated by the main power supply being turned off.

<Modifications>

Hereinafter, an imaging apparatus 1A and an imaging apparatus 1B according to modifications of the imaging apparatus 1 will be described (see FIGS. 24 to 33).

The imaging apparatus 1A shown below is different from the imaging apparatus 1 described above only in that a cap body is moved by sliding and thus, only a difference from the imaging apparatus 1 will be described in detail and a description of other units is omitted by attaching the same reference numerals as those attached to similar units in the imaging apparatus 1.

The imaging apparatus 1B shown below is different from the imaging apparatus 1 described above only in that a projection lens for a projector is provided and thus, only a difference from the imaging apparatus 1 will be described in detail and a description of other units is omitted by attaching the same reference numerals as those attached to similar units in the imaging apparatus 1.

First, the imaging apparatus 1A will be described (see FIGS. 24 to 28). The imaging apparatus 1A includes, for example, an apparatus body 2A formed in a substantially rectangular parallelepiped shape, a cap body 3A movably supported on the apparatus body 2A and formed in a substantially rectangular shape, and a cover body 4A freely rotatably supported on the apparatus body 2A and formed in a substantially rectangular shape. However, the shapes of the apparatus body 2A, the cap body 3A, and the cover body 4A are not limited to the substantially rectangular parallelepiped shape or the substantially rectangular shape and each may be formed in a shape similar to the shape of the apparatus body 2, the cap body 3, or the cover body 4 of the imaging apparatus 1.

Figure 24:
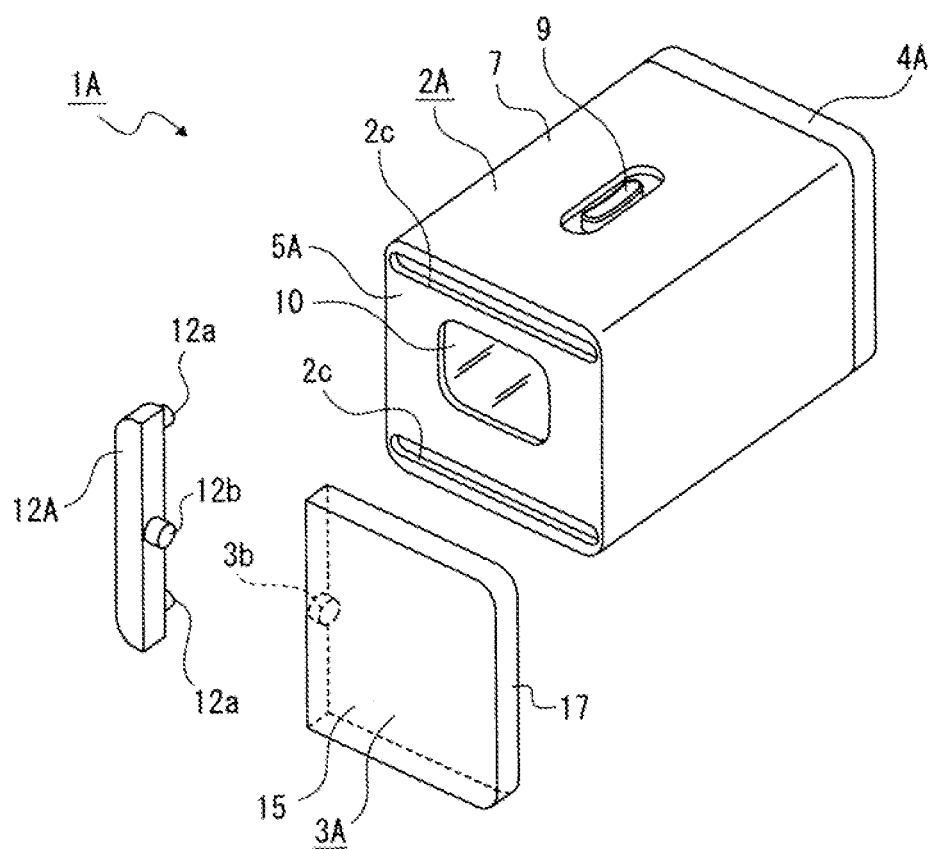
FIG. 24 shows a first modification together with FIGS. 25 to 28 and this is a perspective view showing by exploding the cap body and the support mechanism.
Figure 25:
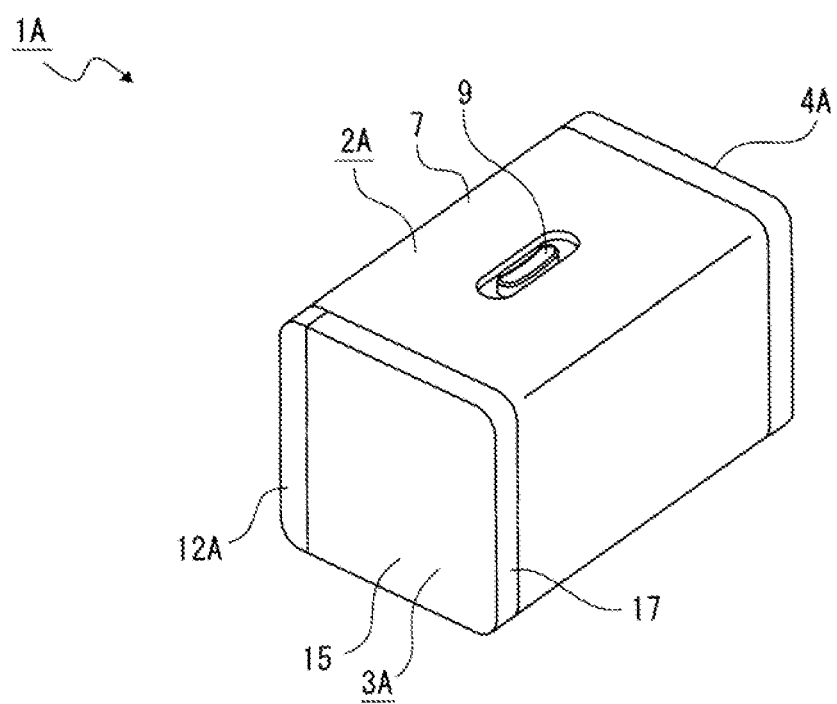
FIG. 25 is a perspective view showing the state in which the cap body is in the closed position.
Figure 26:
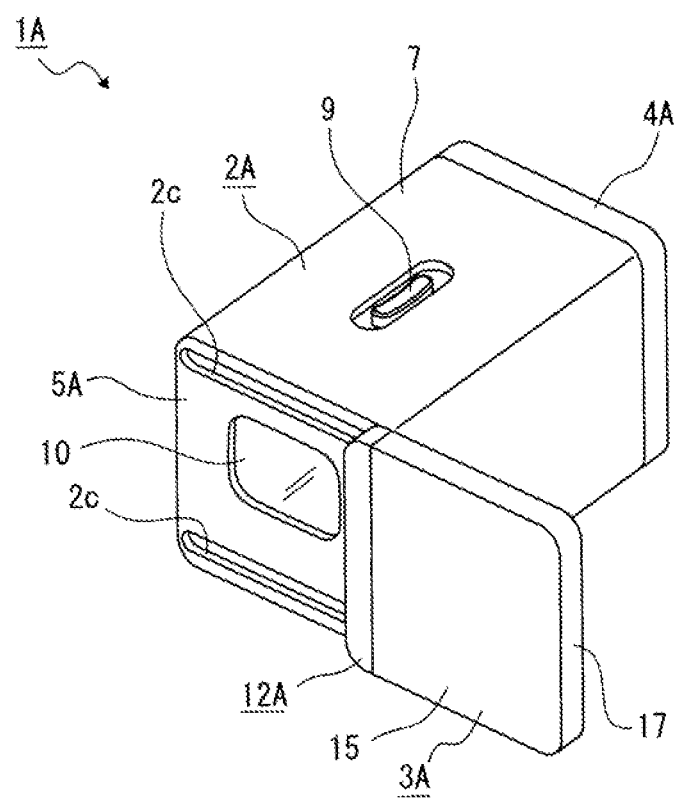
FIG. 26 is a perspective view showing the state in which the cap body is slid to the open position.

Guiding grooves 2*c*, 2*c* opened in the forward direction are formed on a lens arrangement surface 5A of the apparatus body 2A by being spaced vertically (see FIG. 24). The guiding grooves 2*c*, 2*c* extend in the left and right directions and are formed on upper and lower ends of the lens arrangement surface 5A.

A support hole 3*b* opened laterally is formed in the cap body 3A. The cap body 3A is slidably and rotatably supported on the apparatus body 2A by a support mechanism 12A functioning as a sliding mechanism and a rotation mechanism.

The support mechanism 12A is formed like a rod. The support mechanism 12A is provided with guided protruding portions 12*a*, 12*a* protruding in the backward direction and a fulcrum shaft 12*b* protruding laterally and the guided protruding portions 12*a*, 12*a* are provided on both ends in the longitudinal direction.

The support mechanism 12A is slidably supported on the apparatus body 2A in the left and right directions by the guided protruding portions 12*a*, 12*a* being inserted into the guiding grooves 2*c*, 2*c*.

An example in which the guided protruding portions 12*a*, 12*a* are provided in the support mechanism 12A and the guiding grooves 2*c*, 2*c* into which the guided protruding portions 12*a*, 12*a* are inserted are formed in the apparatus body 2A is shown above, but guided grooves may be formed in the support mechanism 12A and guiding protruding portions inserted into the guided grooves may be provided in the apparatus body 2A.

The cap body 3A is slidably supported on the apparatus body 2A via the support mechanism 12A between the closed position (see FIG. 25) where the imaging lens 10 of the apparatus body 2A is closed and the open position (see FIG. 26) where the imaging lens 10 is opened.

Figure 27:
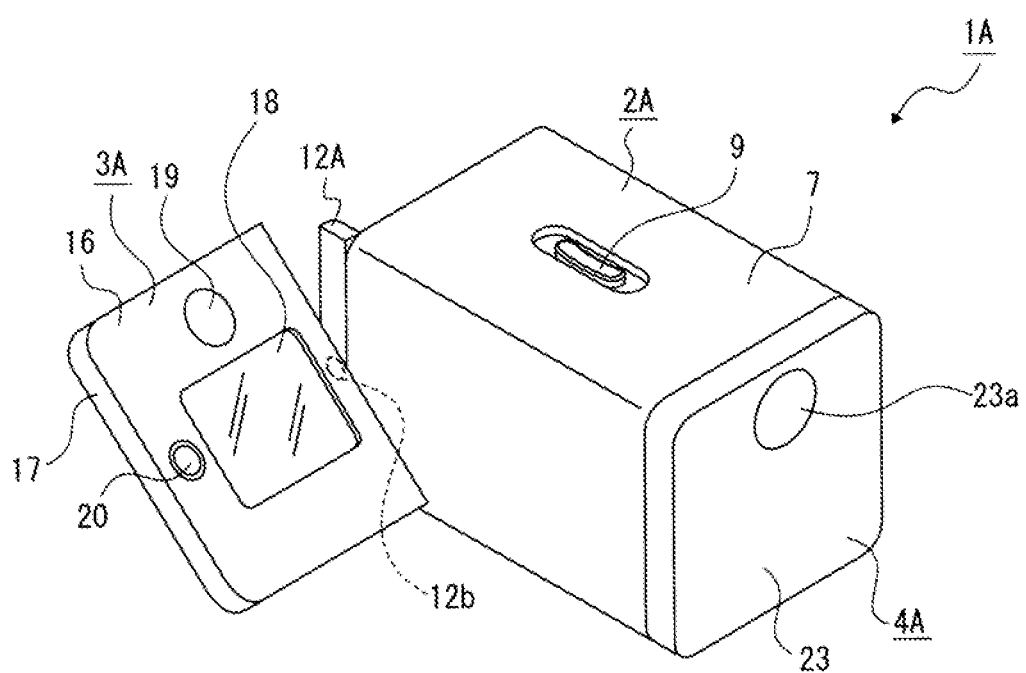
FIG. 27 is a perspective view showing the state in which the cap body is rotated in one direction using a fulcrum shaft as the fulcrum.
Figure 28:
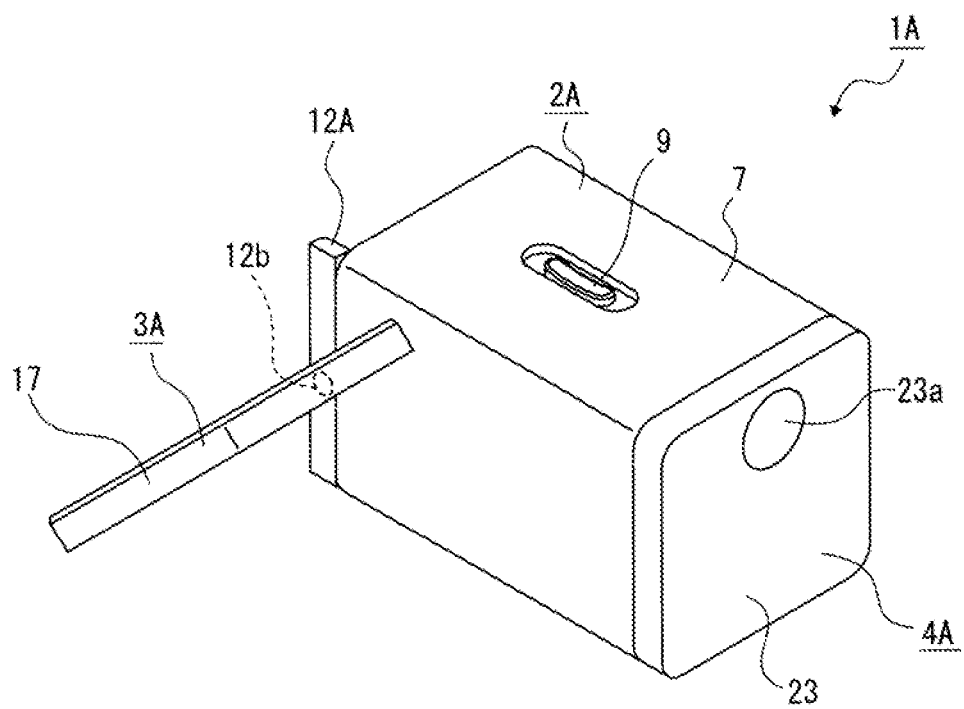
FIG. 28 is a perspective view showing the state in which the cap body is rotated in the other direction using the fulcrum shaft as the fulcrum.

The cap body 3A is connected to the support mechanism 12A by the fulcrum shaft 12*b* being inserted into the support hole 3*b* and is made rotatable around the fulcrum shaft 12*b* with respect to the apparatus body 2A via the support mechanism 12A using the fulcrum shaft 12*b* as a fulcrum (see FIGS. 27 and 28).

An example in which the fulcrum shaft 12*b* is provided in the support mechanism 12A and the support hole 3*b* into which the fulcrum shaft 12*b* is inserted is formed in the cap body 3A is shown above, but conversely, the support hole may be formed in the support mechanism 12A and the fulcrum shaft inserted into the support hole may be provided in the cap body 3A.

The cap body 3A is slid, as described above, between the closed position and the open position with respect to the apparatus body 2A and the main power supply of the imaging apparatus 1A is turned on when the cap body 3A is slid from the closed position to the open position and the main power supply of the imaging apparatus 1A is turned off when the cap body 3A is slid from the open position to the closed position.

Thus, the main power supply is turned on when the cap body 3A is slid from the closed position to the open position in the imaging apparatus 1A and therefore, there is no need to perform an operation to turn on the main power supply and the usability of the imaging apparatus 1A can be improved and also there is no need to provide a power button and therefore, the manufacturing cost of the imaging apparatus 1A can be reduced by decreasing the number of components.

The cover body 4A is rotatably or slidably supported on the apparatus body 2A between the closing position and the opening position.

By making the cover body 4A slidable in the same direction as the sliding direction of the cap body 3A between the closed position and the open position when the cover body 4A is slid, the operation direction to slide the cap body 3A and the operation direction to slide the cover body 4A are matched so that the usability of the imaging apparatus 1A can be improved by improved operability.

In the imaging apparatus 1A, as described above, the cap body 3A is slidably supported on the apparatus body 2A and the cap body 3A is moved between the open position and the closed position by being slid with respect to the apparatus body 2A and therefore, the imaging lens 10 and the display 18 are opened/closed by a simple operation of the cap body 3A and improvements of usability can be achieved.

In addition, the cap body 3A is rotatably supported on the apparatus body 2A around the fulcrum shaft 12b and the cap body 3A is moved to different locations by both of sliding and rotation with respect to the apparatus body 2A and therefore, the degree of flexibility of the orientation of the display 18 is increased and improvements of usability can be achieved.

Examples in which the cap body 3A and the cover body 4A are each slid in the left and right directions are shown above, but the sliding direction of the cap body 3A and the cover body 4A is not limited to the left and right directions and may be the up and down directions or an oblique direction. Next, the imaging apparatus 1B will be described (see FIGS. 29 to 33).

Figure 29:
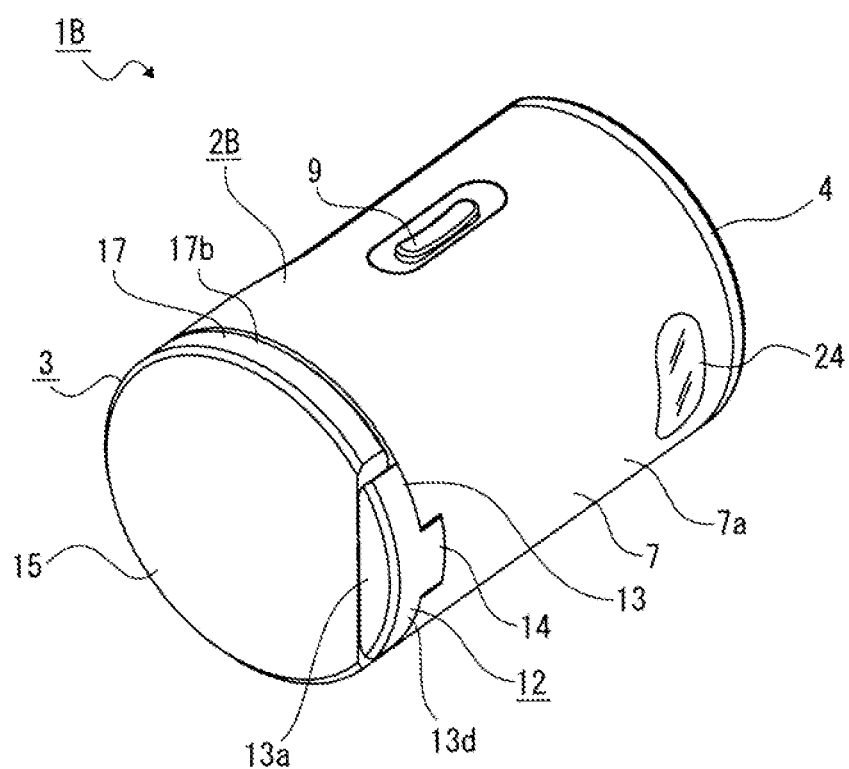
FIG. 29 shows a second modification together with FIGS. 30 to 33 and this is a perspective view showing the state in which the cap body is in the closed position.

The imaging apparatus 1B formed in the same shape as the imaging apparatus 1 and includes an apparatus body 2B, the cap body 3, and the cover body 4 (see FIG. 29).

The apparatus body 2B has a projection lens 24 arranged on a back end of the outer circumferential surface 7. Therefore, the imaging apparatus 1B is enabled to show captured images on a screen or the like by projecting such images from the projection lens 24 and also functions as a projector.

Figure 30:
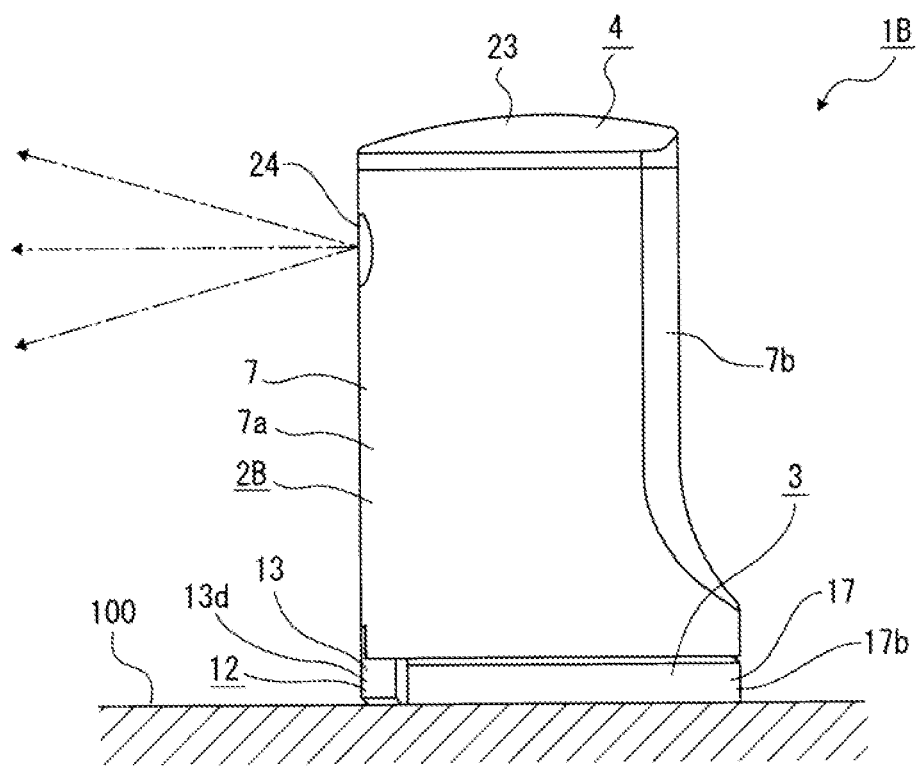
FIG. 30 is a side view showing the state in which a projection mode is set.

When the imaging apparatus 1B is used as a projector, for example, the apparatus body 2B is made vertically oriented such that the optical axis direction of the imaging lens 10 becomes the up and down directions and the imaging apparatus 1B is placed on a mounting surface 100 such as a desk in an orientation in which the cover body 4 is positioned above the apparatus body 2B (see FIG. 30).

In the imaging apparatus 1B, when the apparatus body 2B is made vertically oriented such that the optical axis direction of the imaging lens 10 becomes the up and down directions, a projection mode in which operations of the recording button 19 and the playback button 20 are disabled and images can be projected from the projection lens 24 is set.

By placing the imaging apparatus 1B on the mounting surface 100 in such a state, light is projected horizontally to be able to show played-back images on a screen or the like.

Figure 31:
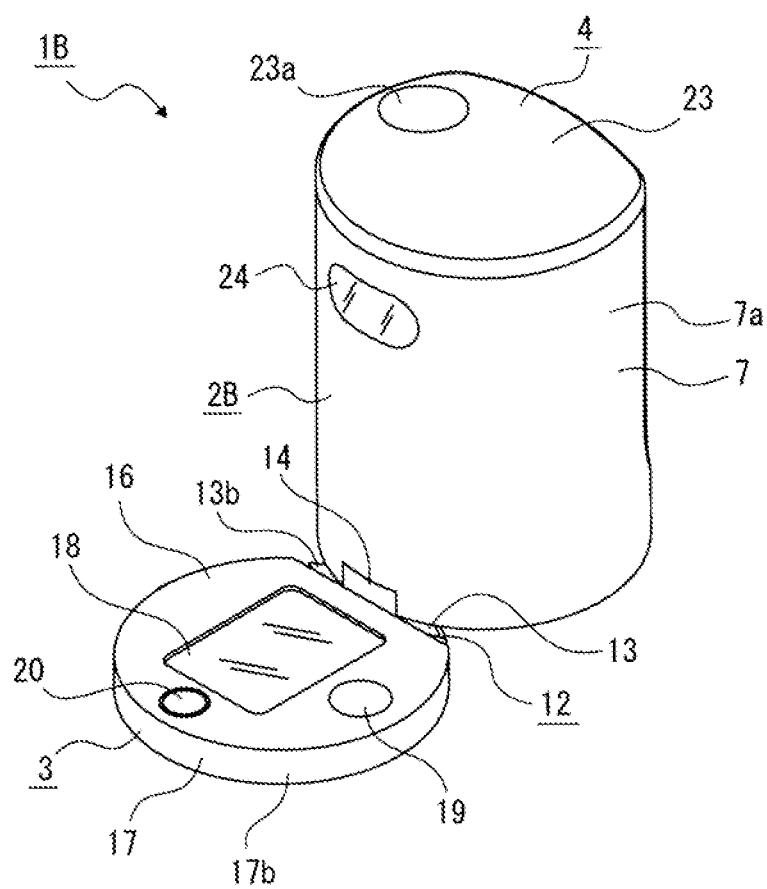
FIG. 31 is a side view showing the state in which the cap body is rotated by 180 degrees and a portion of the cap body and a portion of the apparatus body are placed on a mounting surface to be used as a projector.
Figure 32:
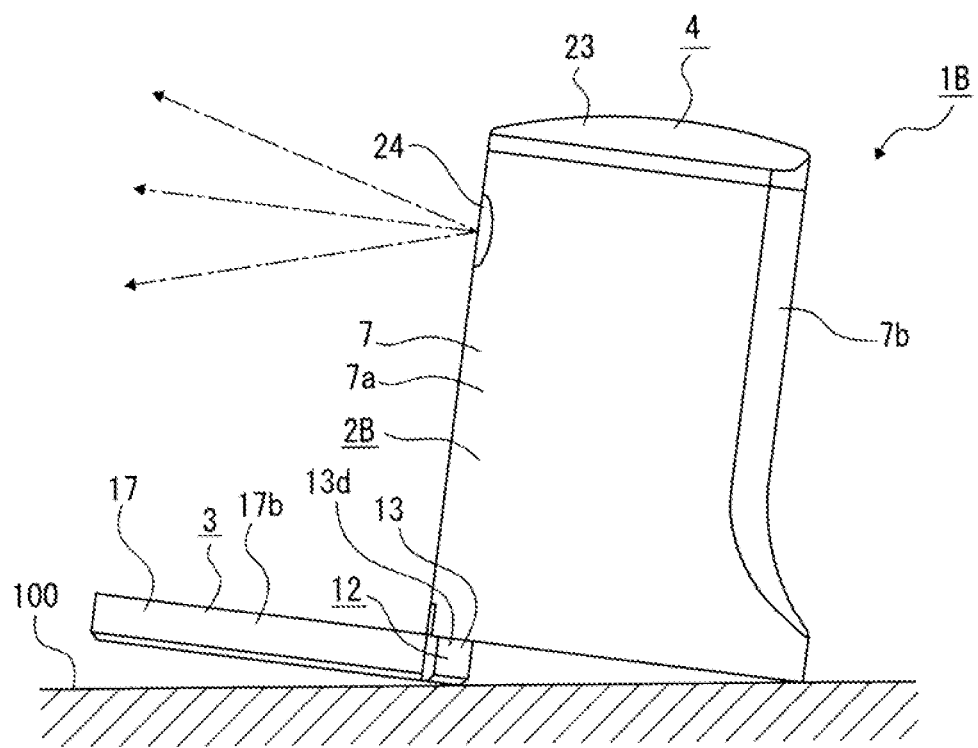
FIG. 32 is a perspective view showing the state in which the cap body is rotated by 180 degrees and a portion of the cap body and a portion of the apparatus body are placed on the mounting surface to be used as the projector.

In addition, the imaging apparatus 1B can be used as a projector by rotating the cap body 3 by 180° with respect to the apparatus body 2B using the first fulcrum shaft 14a as a fulcrum and placing a portion of the cap body 3 and a portion of the apparatus body 2B on the mounting surface 100 (see FIGS. 31 and 32).

By placing the imaging apparatus 1B on the mounting surface 100 in such a state, light is projected in an upward state to be able to show captured images on a screen or the like.

Figure 33:
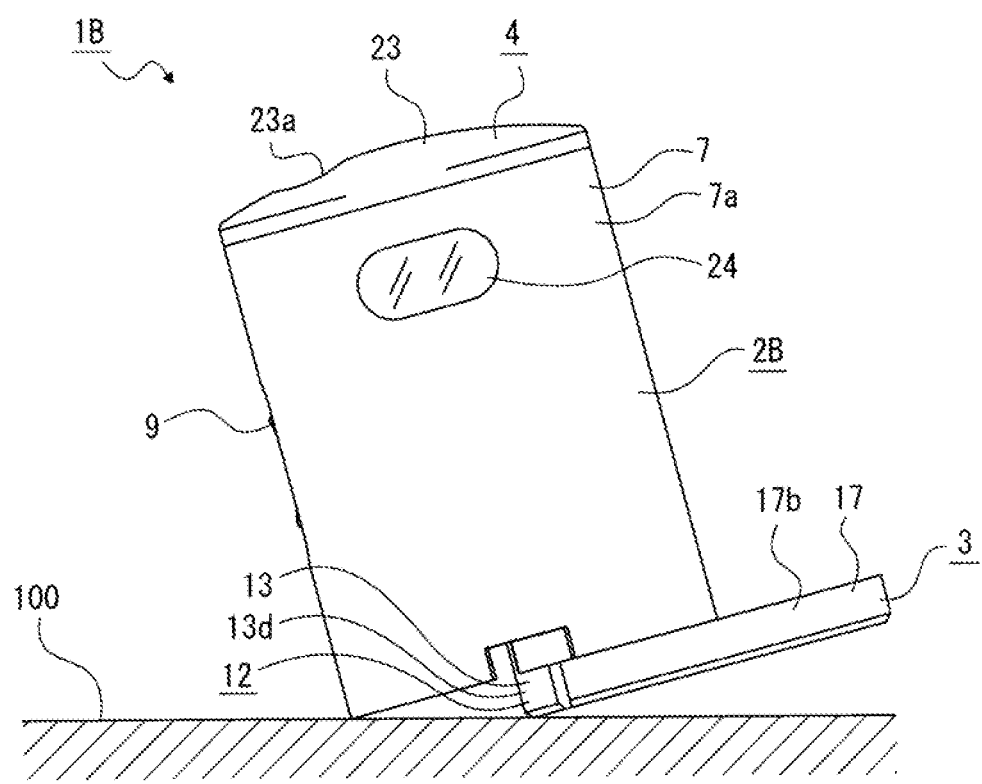
FIG. 33 is a front view showing the state in which the cap body is rotated by any angle and a portion of the cap body and a portion of the apparatus body are placed on the mounting surface to be used as the projector.

Further, the imaging apparatus 1B can also be used as a projector by rotating the cap body 3 by any angle with respect to the apparatus body 2B using the first fulcrum shaft 14a as a fulcrum and placing a portion of the cap body 3 and a portion of the apparatus body 2B on the mounting surface 100 (see FIG. 33). In such a case, it is desirable to have an image processing function and an optical horizontal correction function of images so that an image is not projected in an oblique state.

By placing the imaging apparatus 1B on the mounting surface 100 in such a state, light is projected in an obliquely upward state to be able to show captured images on a screen or the like.

In the imaging apparatus 1B, as described above, the projection lens 24 is provided in the apparatus body 2B and captured images are enabled to be projected from the projection lens 24.

Therefore, the imaging apparatus 1B can be used as a projector and the usability of the imaging apparatus 1B can be improved with extended uses.

Also in the imaging apparatus 1B, the projecting mode can easily be set and improvements of usability can be achieved by enabling an automatic setting of the projection mode in accordance with the orientation in which the cap body 3 and the apparatus body 2B are positioned vertically by making the apparatus body 2B vertically oriented so that the optical axis direction of the imaging lens 10 becomes the up and down directions.

Also the imaging apparatus 1A described above may be configured to allow the imaging apparatus to be used as a projector by providing the projection lens 24 on the outer circumferential surface 7.

SUMMARY

In the imaging apparatuses 1, 1A, 1B, as described above, the cap bodies 3, 3A having the display 18 are moved between the open position and the closed position with respect to the apparatus bodies 2, 2A, 2B, the imaging lens 10 is closed after the cap bodies 3, 3A are moved to the closed position, and the imaging lens 10 is opened after the cap bodies 3, 3A are moved to the open position.

Therefore, the imaging lens 10 is protected by being covered with the cap bodies 3, 3A provided with the display 18 in the closed position and therefore, a dedicated member to protect the imaging lens 10 is not necessary and the apparatus can be made smaller in size by decreasing the number of components.

Also, the display 18 is closed after the cap bodies 3, 3A are moved to the closed position and the display 18 is opened after the cap bodies 3, 3A are moved to the open position.

Therefore, the display 18 is closed in the closed position together with the imaging lens 10 and respective dedicated members to close the display 18 and the imaging lens 10 are not necessary so that the apparatus can be made smaller in size by further decreasing the number of components.

Each mode described above may automatically be set or manual settings including power-on and power-off may be enabled for a portion or all of modes.

Each mode described above may automatically be set or manual settings including power-on and power-off may be enabled for a portion or all of modes.

It should be understood by those skilled in the art that various modifications, combinations, sub-combinations and alterations may occur depending on design requirements and other factors insofar as they are within the scope of the appended claims or the equivalents thereof.

<The Present Technology>

Additionally, the present technology may also be configured as below.

(1) An imaging apparatus including:
an apparatus body provided with an imaging lens on one end;
a cap body capable of moving between an open position and a closed position with respect to the apparatus body, the cap body being provided with a display; and
a support mechanism that movably supports the cap body with respect to the apparatus body, wherein
the imaging lens is closed while the cap body is positioned in the closed position, and the imaging lens is opened while the cap body is positioned in the open position.

(2) The imaging apparatus according to (1), wherein the display is closed while the cap body is positioned in the closed position, and the display is opened while the cap body is positioned in the open position.

(3) The imaging apparatus according to (1) or (2), wherein
the support mechanism includes a rotation mechanism, and
the cap body is rotatably supported on the apparatus body via the rotation mechanism.

(4) The imaging apparatus according to any one of (1) to (3), wherein
the support mechanism includes a first fulcrum shaft extending in an optical axis direction of the imaging lens and a second fulcrum shaft extending in a direction orthogonal to the optical axis direction, and
the cap body is rotated around the first fulcrum shaft using the first fulcrum shaft as a fulcrum and also rotated around the second fulcrum shaft using the second fulcrum shaft as a fulcrum.

(5) The imaging apparatus according to (1) or (2), wherein
the support mechanism includes a sliding mechanism, and
the cap body is slidably supported on the apparatus body via the sliding mechanism.

(6) The imaging apparatus according to (5), wherein
the support mechanism further includes a rotation mechanism, and
the cap body is rotatably supported on the apparatus body via the rotation mechanism.

(7) The imaging apparatus according to (4) or (6), wherein
the cap body is, in the closed position, in one of an opposed state in which the display points to a side of the apparatus body to be opposed to the imaging lens and a non-opposed state in which the display points to an opposite side of the side of the apparatus body, and
the imaging apparatus further includes a control unit that sets a playback mode when the cap body is in the non-opposed state.

(8) The imaging apparatus according to any one of (1) to (7), wherein
a main power supply is turned on in accordance with movement of the cap body from the closed position to the open position.

(9) The imaging apparatus according to any one of (1) to (8), wherein
a surface of the apparatus body on which the imaging lens is provided is formed as a lens arrangement surface,
a surface of the cap body on which the display is provided is formed as a display arrangement surface, and
when the cap body is positioned in the closed position, an outer circumference of the lens arrangement surface and an outer circumference of the display arrangement surface are matched in an optical axis direction of the imaging lens.

(10) The imaging apparatus according to any one of (1) to (9), wherein
the cap body is formed in a plane shape in which a thickness direction of the cap body matches a thickness direction of the display.

(11) The imaging apparatus according to any one of (1) to (10), wherein
a surface of the cap body on which the display is provided is formed as a display arrangement surface, and
an operation button is arranged on the display arrangement surface.

(12) The imaging apparatus according to (1), wherein
a battery insertion hole into which a battery is inserted is formed in the apparatus body, and
a cover body movably supported between an opening position and a closing position that opens and closes the battery insertion hole is provided in the apparatus body.

(13) The imaging apparatus according to (12), wherein
the cover body is rotatable with respect to the apparatus body.

(14) The imaging apparatus according to (13), wherein
a rotatable direction of the cover body with respect to the apparatus body and a rotatable direction of the cap body with respect to the apparatus body are a same direction.

(15) The imaging apparatus according to any one of (12) to (14), wherein
a surface of the apparatus body on which the battery insertion hole is formed is set as a battery insertion surface,
a surface of the cover body that closes the battery insertion hole is set as an opposed surface, and
when the cover body is positioned in the closing position, an outer circumference of the battery insertion surface and an outer circumference of the opposed surface are matched in an optical axis direction of the imaging lens.

(16) The imaging apparatus according to any one of (12) to (15), wherein
the cover body is formed in a plane shape in which a thickness direction of the cover body matches an optical axis direction of the imaging lens.

(17) The imaging apparatus according to any one of (12) to (16), wherein
an operation recess capable of having a finger inserted therein is formed in the cover body.

(18) The imaging apparatus according to any one of (1) to (17), wherein
a projection lens is provided in the apparatus body, and
the projection lens is capable of having an image projected therefrom.

(19) The imaging apparatus according to (18), further including:
a control unit that sets a projection mode in which the image is projected from the projection lens when the cap body and the apparatus body are positioned vertically while the cap body is in the closed state.

(20) The imaging apparatus according to any one of (1) to (19), wherein
a coating surface portion in a curved surface shape and a gripping surface portion in a substantially plane shape are formed on an outer circumferential surface of the apparatus body.

What is claimed is:

1. An imaging apparatus comprising:
an apparatus body provided with an imaging lens on one end;
a cap body capable of moving between an open position and a closed position with respect to the apparatus body, the cap body being provided with a display;
a support mechanism configured to movably support the cap body with respect to the apparatus body, wherein
the imaging lens is closed while the cap body is positioned in the closed position, and the imaging lens is opened while the cap body is positioned in the open position; and
a projection lens is provided in the apparatus body, wherein the projection lens is capable of having an image projected therefrom.

2. The imaging apparatus according to claim 1, wherein the display is closed while the cap body is positioned in the closed position, and the display is opened while the cap body is positioned in the open position.

3. The imaging apparatus according to claim 1, wherein
the support mechanism includes a rotation mechanism, and
the cap body is rotatably supported on the apparatus body via the rotation mechanism.

4. The imaging apparatus according to claim 3, wherein
the support mechanism includes a first fulcrum shaft extending in an optical axis direction of the imaging lens and a second fulcrum shaft extending in a direction orthogonal to the optical axis direction, and
the cap body is rotated around the first fulcrum shaft using the first fulcrum shaft as a fulcrum and also rotated around the second fulcrum shaft using the second fulcrum shaft as a fulcrum.

5. The imaging apparatus according to claim 1, wherein
the support mechanism includes a sliding mechanism, and
the cap body is slidably supported on the apparatus body via the sliding mechanism.

6. The imaging apparatus according to claim 5, wherein
the support mechanism further includes a rotation mechanism, and the cap body is rotatably supported on the apparatus body via the rotation mechanism.

7. The imaging apparatus according to claim 4, wherein
the cap body is, in the closed position, in one of an opposed state in which the display points to a side of the apparatus body to be opposed to the imaging lens and a non-opposed state in which the display points to an opposite side of the side of the apparatus body, and
the imaging apparatus further includes a control unit that sets a playback mode in an event the cap body is in the non-opposed state.

8. The imaging apparatus according to claim 1, wherein
a main power supply is turned on in accordance with movement of the cap body from the closed position to the open position.

9. The imaging apparatus according to claim 1, wherein
a surface of the apparatus body on which the imaging lens is provided is formed as a lens arrangement surface,
a surface of the cap body on which the display is provided is formed as a display arrangement surface, and
in an event the cap body is positioned in the closed position, an outer circumference of the lens arrangement surface and an outer circumference of the display arrangement surface are matched in an optical axis direction of the imaging lens.

10. The imaging apparatus according to claim 1, wherein
the cap body is formed in a plane shape in which a thickness direction of the cap body matches a thickness direction of the display.

11. The imaging apparatus according to claim 1, wherein
a surface of the cap body on which the display is provided is formed as a display arrangement surface, and
an operation button is arranged on the display arrangement surface.

12. The imaging apparatus according to claim 1, wherein
a battery insertion hole into which a battery is inserted is formed in the apparatus body, and
a cover body movably supported between an opening position and a closing position that opens and closes the battery insertion hole is provided in the apparatus body.

13. The imaging apparatus according to claim 12, wherein
the cover body is rotatable with respect to the apparatus body.

14. The imaging apparatus according to claim 12, wherein
a surface of the apparatus body on which the battery insertion hole is formed is set as a battery insertion surface,
a surface of the cover body that closes the battery insertion hole is set as an opposed surface, and
in an event the cover body is positioned in the closing position, an outer circumference of the battery insertion surface and an outer circumference of the opposed surface are matched in an optical axis direction of the imaging lens.

15. The imaging apparatus according to claim 12, wherein
the cover body is formed in a plane shape in which a thickness direction of the cover body matches an optical axis direction of the imaging lens.

16. The imaging apparatus according to claim 12, wherein
an operation recess capable of having a finger inserted therein is formed in the cover body.

17. The imaging apparatus according to claim 1, further comprising:
a control unit that sets a projection mode in which the image is projected from the projection lens in an event the cap body and the apparatus body are positioned vertically while the cap body is in the closed state.

18. The imaging apparatus according to claim 1, wherein
a coating surface portion in a curved surface shape and a gripping surface portion in a substantially plane shape are formed on an outer circumferential surface of the apparatus body.

19. An imaging apparatus comprising:
an apparatus body provided with an imaging lens on one end;
a cap body capable of moving between an open position and a closed position with respect to the apparatus body, the cap body being provided with a display;
a support mechanism configured to movably support the cap body with respect to the apparatus body, wherein the imaging lens is closed while the cap body is positioned in the closed position, and the imaging lens is opened while the cap body is positioned in the open position; and a cover body rotatable with respect to the apparatus body, wherein a rotatable direction of the cover body and a rotatable direction of the cap body with respect to the apparatus body are a same direction.

* * * * *